(12) United States Patent
Fleck et al.

(10) Patent No.: US 12,229,229 B2
(45) Date of Patent: *Feb. 18, 2025

(54) SYSTEMS AND METHODS FOR ADDING WATERMARKS USING AN EMBEDDED BROWSER

(71) Applicant: Citrix Systems, Inc., Fort Lauderdale, FL (US)

(72) Inventors: Christopher Fleck, Fort Lauderdale, FL (US); Rachelle Tobkes, Fort Lauderdale, FL (US); Stephen Wilson, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/838,759

(22) Filed: Jun. 13, 2022

(65) Prior Publication Data

US 2022/0300584 A1 Sep. 22, 2022

Related U.S. Application Data

(63) Continuation of application No. 16/403,007, filed on May 3, 2019, now Pat. No. 11,403,373.
(Continued)

(51) Int. Cl.
*G06F 21/16* (2013.01)
*H04L 9/40* (2022.01)
*G06F 21/10* (2013.01)

(52) U.S. Cl.
CPC ............ *G06F 21/16* (2013.01); *H04L 63/20* (2013.01); *G06F 21/1063* (2023.08)

(58) Field of Classification Search
CPC ..................................................... G06F 21/16
See application file for complete search history.

(56) References Cited

U.S. PATENT DOCUMENTS 6,131,162 A 10/2000 Yoshiura et al.
6,954,854 B1 10/2005 Miura et al.
(Continued)

FOREIGN PATENT DOCUMENTS

CN 102449609 A 5/2012
CN 105844121 A 8/2016

OTHER PUBLICATIONS

First Office Action for CN Appl. No. 201980040270.6, dated Jul. 29, 2022.
(Continued)

*Primary Examiner* — Simon P Kanaan

(57) ABSTRACT

Embodiments described include systems and methods for adding watermarks using an embedded browser. To provide protection to sensitive information from a network application rendered via an embedded browser of a client application, the client application can generate an overlay with a digital watermark, and apply the overlay over the embedded browser. The client application can selectively generate such overlays, and can customize the format of the digital watermark according to the information rendered on the embedded browser. The watermark can remain with any information that is imaged from the embedded browser, and provides a deterrent against misuse of the information via image capture from a computer screen for instance. By adjusting properties (e.g., contrast) of such an image, the watermark can be made visible and detectable, thus allowing such imaging activities and information to be tracked.

20 Claims, 14 Drawing Sheets

Related U.S. Application Data

(60) Provisional application No. 62/667,234, filed on May 4, 2018.

(56) References Cited

U.S. PATENT DOCUMENTS

| | | |
|---|---|---|
| 2001/0021978 A1 | 9/2001 | Okayasu et al. |
| 2002/0033844 A1* | 3/2002 | Levy .................... G06F 3/0484 715/744 |
| 2003/0130954 A1* | 7/2003 | Carr ....................... G06Q 30/02 705/60 |
| 2011/0314550 A1 | 12/2011 | Mastrangelo et al. |
| 2014/0247961 A1 | 9/2014 | Kim et al. |
| 2015/0186634 A1 | 7/2015 | Crandell et al. |
| 2017/0012076 A1 | 1/2017 | Chen et al. |
| 2017/0053372 A1 | 2/2017 | Koch et al. |
| 2017/0068829 A1 | 3/2017 | Shaw et al. |
| 2017/0142076 A1 | 5/2017 | Ford et al. |

OTHER PUBLICATIONS

Office Action on CA Appl. No. 3096532 dated Sep. 13, 2022.
Examination Report for AU Appl. No. 2019262611, dated Nov. 15, 2021.
Examination Report on AU Appl. No. 2019262611 dated Mar. 19, 2021.
Examiner's Report on CA Appl. No. 3096532 dated Oct. 22, 2021.
Final Office Action on U.S. Appl. No. 16/403,007 dated Nov. 26, 2021.
International Preliminary Report on Patentability on PCT Appl. No. PCT/US2019/030651 mailed Nov. 11, 2020.
International Search Report and Written Opinion on PCT Appl. No. PCT/US2019/030651 mailed Jul. 5, 2019.
Non-Final Office Action on U.S. Appl. No. 16/403,007 DTD Jun. 10, 2021.
Notice of Allowance on U.S. Appl. No. 16/403,007 dated Mar. 28, 2022.
Examination Report on EP Appl. No. dated Feb. 23, 2023.

* cited by examiner

SYSTEMS AND METHODS FOR ADDING WATERMARKS USING AN EMBEDDED BROWSER

CROSS-REFERENCE TO RELATED APPLICATIONS

This application is a continuation of and claims priority to U.S. patent application Ser. No. 16/403,007, titled "SYSTEMS AND METHODS FOR ADDING WATERMARKS USING AN EMBEDDED BROWSER," filed May 3, 2019, which claims priority under 35 U.S.C. § 119(e) to U.S. Provisional Patent Application No. 62/667,234, titled "SYSTEMS AND METHODS FOR ADDING WATERMARKS USING AN EMBEDDED BROWSER," filed May 4, 2018, which is incorporated herein by reference in its entirety.

FIELD OF THE DISCLOSURE

The present application generally relates to management of resources, including but not limited to systems and methods for using an embedded browser to add watermarks.

BACKGROUND

As the workforce of an enterprise becomes more mobile and work under various conditions, an individual can use one or more client devices, including personal devices, to access network resources such as web applications. Due to differences between the client devices and the manner in which network resources can be accessed, there are significant challenges to the enterprise in protecting resources such as documents, and in monitoring for potential misuse.

BRIEF SUMMARY

The present disclosure is directed towards systems and methods for adding watermarks using an embedded browser. A client application executing on a client device can allow a user to access applications that are served from and/or hosted on one or more servers, such as web applications and software-as-a-service (SaaS) applications (hereafter sometimes generally referred to as network applications). A browser that is embedded or integrated with the client application can render to the user a network application that is accessed or requested via the client application. The browser is sometimes referred to as an embedded browser, and the client application with embedded browser (CEB) is sometimes referred to as a workspace application. To provide protection to sensitive information from a network application rendered via the embedded browser, the client application can generate an overlay with a digital watermark, and apply the overlay over the embedded browser. The client application can selectively generate such overlays, and can customize the format of the digital watermark according to the information rendered on the embedded browser. The watermark can accompany any information that is imaged from the embedded browser, and provides a deterrent against misuse of the information via image capture from a computer screen for instance. By adjusting the properties (e.g., contrast) of such an image, the watermark can be made visible and detectable, thus allowing such imaging activities and information to be tracked.

At least one aspect is directed to a method of watermarking. An embedded browser of a client application on a client device may provide access to a network application hosted on a server. A watermark engine of the client application may apply at least one policy in accessing the network application via the embedded browser. The watermark engine may determine, according to the at least one policy, to apply a watermark to information of the network application accessed via the embedded browser. The embedded browser may display the information with the watermark applied.

In some embodiments, the embedded browser of the client application may initiate a request to access a network application hosted on a server. In some embodiments, the client application may establish, responsive to request, a secure session to communicate the information of the network application to the client application.

In some embodiments, applying the at least one policy may include determining at least one of: a type or profile of the network application, a user of the network application, a content or characteristic of the information of the network application, a type or location of the client device, a temporal window associated with accessing the network application, or an environment of client application.

In some embodiments, applying the at least one policy may include detecting that image acquisition of the information is being performed or is possible. In some embodiments, the watermarking engine may identity the information of the network application accessible via the embedded browser. In some embodiments, the watermark engine may apply the watermark by overlaying the watermark on a portion of at least one of: a user interface of the embedded browser, a display region of the embedded browser, or the information of the network application.

In some embodiments, the watermark may include a hypertext mark-up language (HTML) element or an element of a user interface of the embedded browser. In some embodiments, the watermark engine may set the HTML element to ignore pointer events from user interaction. In some embodiments, the watermark engine may determine a content or format of the watermark according to the information of the network application. In some embodiments, the watermark engine may alter an appearance or visibility of the watermark according to a behavior of a user of the client device, or a content or characteristic of the information being displayed or acquired.

At least one aspect is directed to a system for watermarking. The system may include an embedded browser of a client application executable on one or more processors of a client device. The embedded browser of a client application on a client device may provide access to a network application hosted on a server. The embedded browser may display the information with the watermark applied. The system may include a watermark engine of the client application. The watermark engine may apply at least one policy in accessing the network application via the embedded browser. The watermark engine may determine, according to the at least one policy, to apply a watermark to information of the network application accessed via the embedded browser.

In some embodiments, the embedded browser of the client application may initiate a request to access a network application hosted on a server. In some embodiments, the client application may establish, responsive to request, a secure session to communicate the information of the network application to the client application.

In some embodiments, the watermark engine may apply at least one policy which may include determining at least one of: a type or profile of the network application, a user of the network application, a content or characteristic of the information of the network application, a type or location of the client device, a temporal window associated with accessing the network application, or an environment of client application.

In some embodiments, the watermark engine may apply the at least one policy by detecting that image acquisition of the information is being performed or is possible. In some embodiments, the watermarking engine may identity the information of the network application accessible via the embedded browser. In some embodiments, the watermark engine may apply the watermark by overlaying the watermark on a portion of at least one of: a user interface of the embedded browser, a display region of the embedded browser, or the information of the network application.

In some embodiments, the watermark may include a hypertext mark-up language (HTML) element or an element of a user interface of the embedded browser. In some embodiments, the watermark engine may set the HTML element to ignore pointer events from user interaction. In some embodiments, the watermark engine may determine a content or format of the watermark according to the information of the network application. In some embodiments, the watermark engine may alter an appearance or visibility of the watermark according to a behavior of a user of the client device, or a content or characteristic of the information being displayed or acquired.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 6 is an example representation of an implementation for browser redirection using a secure browser plug-in;

Figure 1:
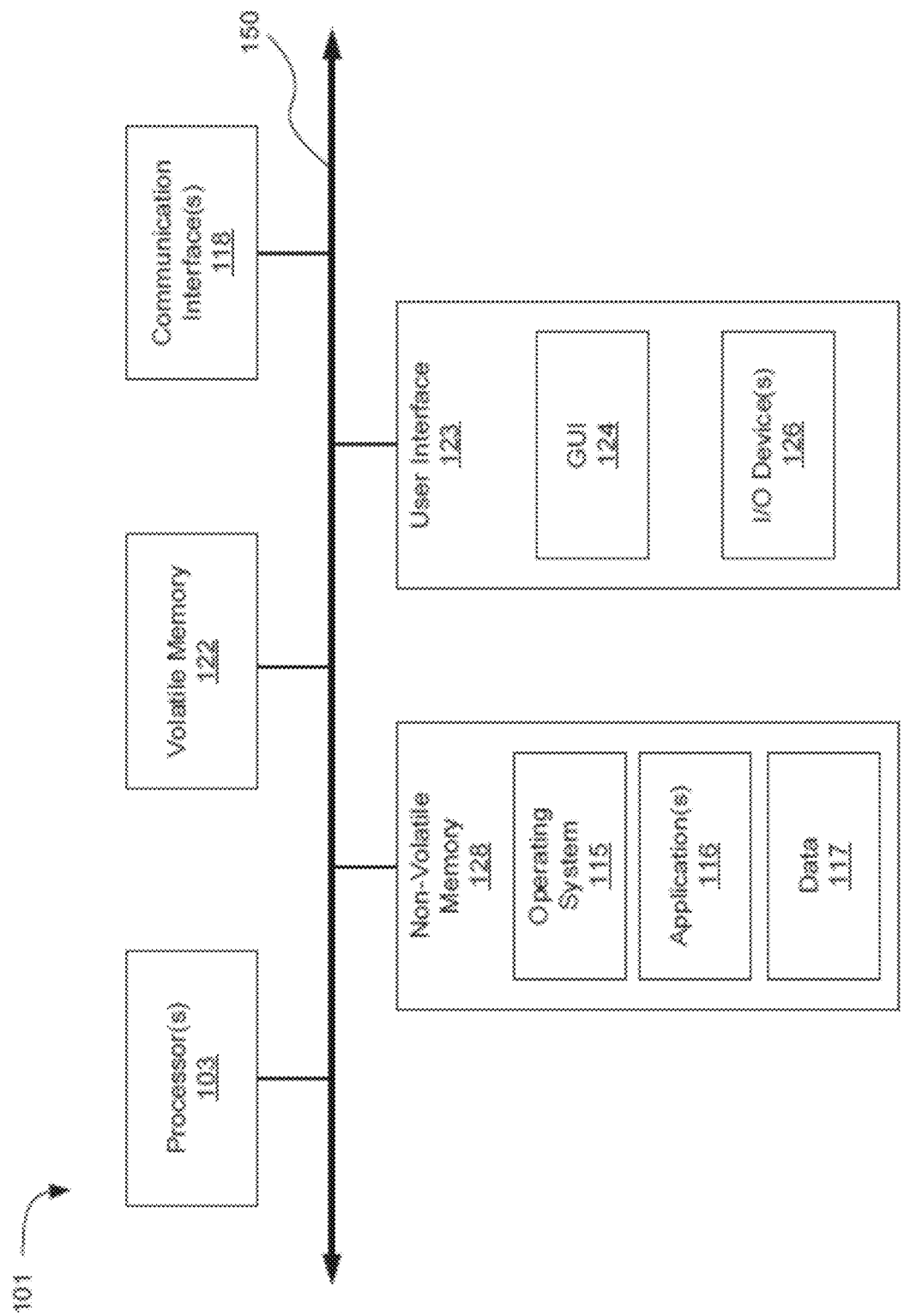
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes systems and methods for an embedded browser.

Section C describes systems and methods for adding watermarks using an embedded browser.

A. Computing Environment

Prior to discussing the specifics of embodiments of the systems and methods detailed herein in Section B, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

B. Systems and Methods for an Embedded Browser

The present disclosure is directed towards systems and methods of an embedded browser. A client application executing on a client device can allow a user to access applications (apps) that are served from and/or hosted on one or more servers, such as web applications and software-as-a-service (SaaS) applications (hereafter sometimes generally referred to as network applications). A browser that is embedded or integrated with the client application can render to the user a network application that is accessed or requested via the client application, and can enable interactivity between the user and the network application. The browser is sometimes referred to as an embedded browser, and the client application with embedded browser (CEB) is sometimes referred to as a workspace application. The client application can establish a secure connection to the one or more servers to provide an application session for the user to access the network application using the client device and the embedded browser. The embedded browser can be integrated with the client application to ensure that traffic related to the network application is routed through and/or processed in the client application, which can provide the client application with real-time visibility to the traffic (e.g., when decrypted through the client application), and user interactions and behavior. The embedded browser can provide a seamless experience to a user as the network application is requested via the user interface (shared by the client application and the embedded browser) and rendered through the embedded browser within the same user interface.

The client application can terminate one end of a secured connection established with a server of a network application, such as a secure sockets layer (SSL) virtual private network (VPN) connection. The client application can receive encrypted traffic from the network application, and can decrypt the traffic before further processing (e.g., rendering by the embedded browser). The client application can monitor the received traffic (e.g., in encrypted packet form), and also have full visibility into the decrypted data stream and/or the SSL stack. This visibility can allow the client application to perform or facilitate policy-based management (e.g., including data loss prevention (DLP) capabilities), application control (e.g., to improve performance, service level), and collection and production of analytics. For instance, the local CEB can provide an information technology (IT) administrator with a controlled system for deploying web and SaaS applications through the CEB, and allow the IT administrator to set policies or configurations via the CEB for performing any of the forgoing activities.

Many web and SaaS delivered applications connect from web servers to generic browsers (e.g., Internet Explorer, Firefox, and so on) of users. Once authenticated, the entire session of such a network application is encrypted. However, in this scenario, an administrator may not have visibility, analytics, or control of the content entering the network application from the user's digital workspace, or the content leaving the network application and entering the user's digital workspace. Moreover, content of a network application viewed in a generic browser can be copied or downloaded (e.g., by a user or program) to potentially any arbitrary application or device, resulting in a possible breach in data security.

This present systems and methods can ensure that traffic associated with a network application is channeled through a CEB. By way of illustration, when a user accesses a SaaS web service with security assertion markup language (SAML) enabled for instance, the corresponding access request can be forwarded to a designated gateway service that determines, checks or verifies if the CEB was used to make the access request. Responsive to determining that a CEB was used to make the access request, the gateway service can perform or provide authentication and single-sign-on (SSO), and can allow the CEB to connect directly to the SaaS web service. Encryption (e.g., standard encryption) can be used for the application session between the CEB and the SaaS web service. When the content from the web service is unencrypted in the CEB to the viewed via the embedded browser, and/or when input is entered via the CEB, the CEB can provide added services on selective application-related information for control and analytics for instance. For example, an analytics agent or application programming interface (API) can be embedded in the CEB to provide or perform the added services.

The CEB (sometimes referred to as workspace application or receiver) can interoperate with one or more gateway services, intermediaries and/or network servers (sometimes collectively referred to as cloud services or Citrix Cloud) to provide access to a network application. Features and elements of an environment related to the operation of an embodiment of cloud services are described below.

Figure 2:
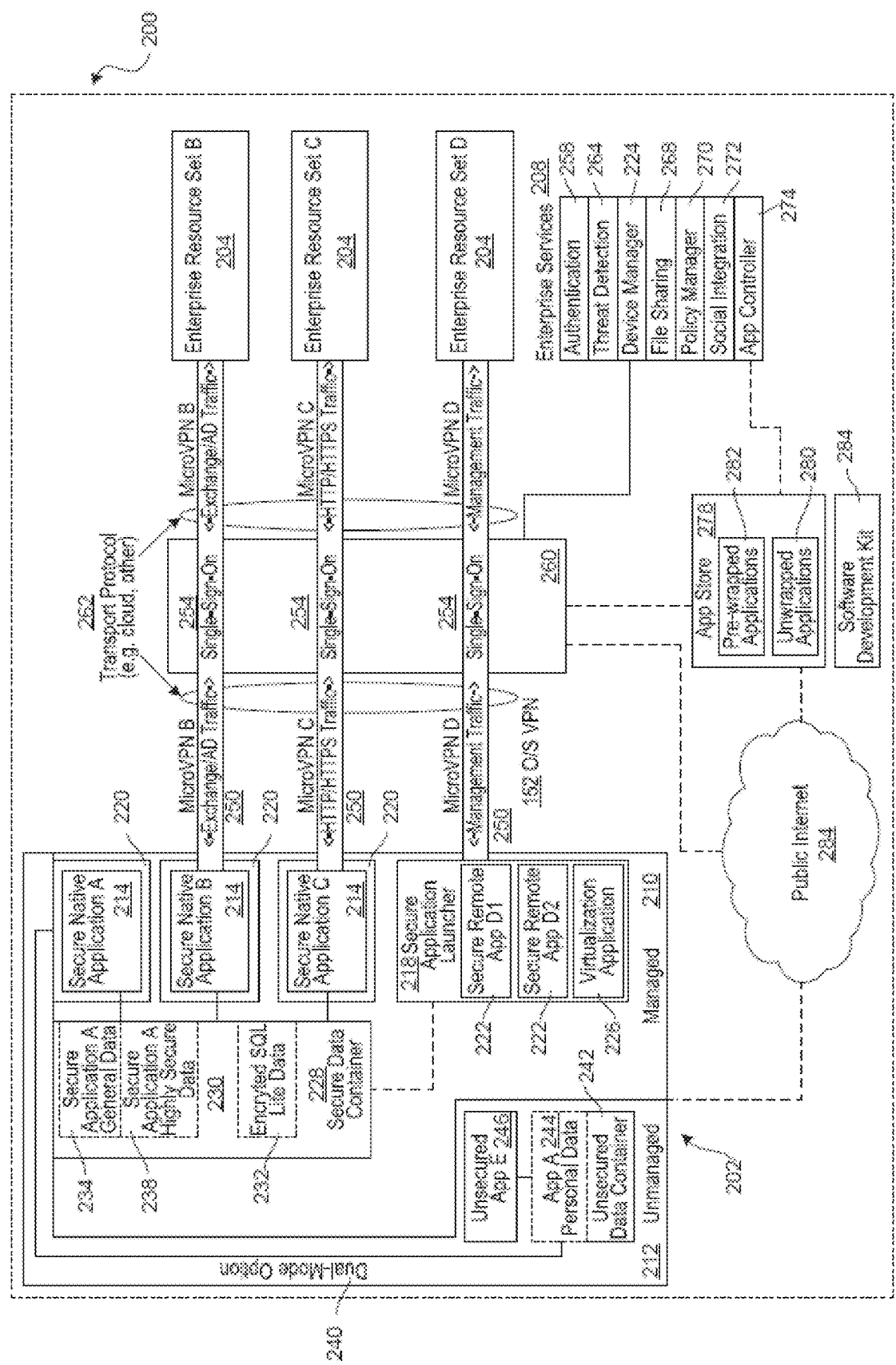
FIG. 2 is a block diagram of an illustrative embodiment of cloud services for use in accessing resources.

FIG. 2 illustrates an embodiment of cloud services for use in accessing resources including network applications. The cloud services can include an enterprise mobility technical architecture 200, which can include an access gateway 260 in one illustrative embodiment. The architecture can be used in a bring-your-own-device (BYOD) environment for instance. The architecture can enable a user of a client device 204 (e.g., a mobile or other device) to both access enterprise or personal resources from a client device 202, and use the client device 204 for personal use. The user may access such enterprise resources 204 or enterprise services 208 via a client application executing on the client device 204. The user may access such enterprise resources 204 or enterprise services 208 using a client device 204 that is purchased by the user or a client device 202 that is provided by the enterprise to user. The user may utilize the client device 202 for business use only or for business and personal use. The client device may run an iOS operating system, and Android operating system, or the like. The enterprise may choose to implement policies to manage the client device 204. The policies may be implemented through a firewall or gateway in such a way that the client device may be identified, secured or security verified, and provided selective or full access to the enterprise resources. The policies may be client device management policies, mobile application management policies, mobile data management policies, or some combination of client device, application, and data management policies. A client device 204 that is managed through the application of client device management policies may be referred to as an enrolled device. The client device management policies can be applied via the client application for instance.

In some embodiments, the operating system of the client device may be separated into a managed partition 210 and an unmanaged partition 212. The managed partition 210 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the client device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is not accessible by unmanaged apps and devices.

The secure applications may be email applications, web browsing applications, software-as-a-service (SaaS) access applications, Windows Application access applications, and the like. The client application can include a secure application launcher 218. The secure applications may be secure native applications 214, secure remote applications 222 executed by the secure application launcher 218, virtualization applications 226 executed by the secure application launcher 218, and the like. The secure native applications 214 may be wrapped by a secure application wrapper 220. The secure application wrapper 220 may include integrated policies that are executed on the client device 202 when the secure native application is executed on the device. The secure application wrapper 220 may include meta-data that points the secure native application 214 running on the client device 202 to the resources hosted at the enterprise that the secure native application 214 may require to complete the task requested upon execution of the secure native application 214. The secure remote applications 222 executed by a secure application launcher 218 may be executed within the secure application launcher application 218. The virtualization applications 226 executed by a secure application launcher 218 may utilize resources on the client device 202, at the enterprise resources 204, and the like. The resources used on the client device 202 by the virtualization applications 226 executed by a secure application launcher 218 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 204, and the like. The resources used at the enterprise resources 204 by the virtualization applications 226 executed by a secure application launcher 218 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application may use the user interaction data as an input to the application operating on the server. In this arrangement, an enterprise may elect to maintain the application on the server side as well as data, files, etc., associated with the application. While an enterprise may elect to "mobilize" some applications in accordance with the principles herein by securing them for deployment on the client device (e.g., via the client application), this arrangement may also be elected for certain applications. For example, while some applications may be secured for use on the client device, others might not be prepared or appropriate for deployment on the client device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the client device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the client device. The enterprise can use a client application, which can include a virtualization application, to allow access to applications that are deemed more properly operated on the server side. In an embodiment, the virtualization application may store some data, files, etc., on the mobile phone in one of the secure storage locations. An enterprise, for example, may elect to allow certain information to be stored on the phone while not permitting other information.

In connection with the virtualization application, as described herein, the client device may have a virtualization application that is designed to present GUIs and then record user interactions with the GUI. The virtualization application may communicate the user interactions to the server side to be used by the server side application as user interactions with the application. In response, the application on the server side may transmit back to the client device a new GUI. For example, the new GUI may be a static page, a dynamic page, an animation, or the like, thereby providing access to remotely located resources.

The secure applications may access data stored in a secure data container 228 in the managed partition 210 of the client device. The data secured in the secure data container may be accessed by the secure wrapped applications 214, applications executed by a secure application launcher 222, virtualization applications 226 executed by a secure application launcher 218, and the like. The data stored in the secure data container 228 may include files, databases, and the like. The data stored in the secure data container 228 may include data restricted to a specific secure application 230, shared among secure applications 232, and the like. Data restricted to a secure application may include secure general data 234 and highly secure data 238. Secure general data may use a strong form of encryption such as Advanced Encryption Standard (AES) 128-bit encryption or the like, while highly secure data 238 may use a very strong form of encryption such as AES 256-bit encryption. Data stored in the secure data container 228 may be deleted from the device upon receipt of a command from the device manager 224. The secure applications may have a dual-mode option 240. The dual mode option 240 may present the user with an option to operate the secured application in an unsecured or unmanaged mode. In an unsecured or unmanaged mode, the secure applications may access data stored in an unsecured data container 242 on the unmanaged partition 212 of the client device 202. The data stored in an unsecured data container may be personal data 244. The data stored in an unsecured data container 242 may also be accessed by unsecured applications 248 that are running on the unmanaged partition 212 of the client device 202. The data stored in an unsecured data container 242 may remain on the client device 202 when the data stored in the secure data container 228 is deleted from the client device 202. An enterprise may want to delete from the client device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The client device 202 may connect to enterprise resources 204 and enterprise services 208 at an enterprise, to the public Internet 248, and the like. The client device may connect to enterprise resources 204 and enterprise services 208 through virtual private network connections. The virtual private network connections, also referred to as microVPN or application-specific VPN, may be specific to particular applications (e.g., as illustrated by microVPNs 250), particular devices, particular secured areas on the client device (e.g., as illustrated by O/S VPN 252), and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 254. The single-sign-on processes may allow a user to provide a single set of authentication credentials, which are then verified by an authentication service 258. The authentication service 258 may then grant to the user access to multiple enterprise resources 204, without requiring the user to provide authentication credentials to each individual enterprise resource 204.

The virtual private network connections may be established and managed by an access gateway 260. The access gateway 260 may include performance enhancement features that manage, accelerate, and improve the delivery of enterprise resources 204 to the client device 202. The access gateway may also re-route traffic from the client device 202 to the public Internet 248, enabling the client device 202 to access publicly available and unsecured applications that run on the public Internet 248. The client device may connect to the access gateway via a transport network 262. The transport network 262 may use one or more transport protocols and may be a wired network, wireless network, cloud network, local area network, metropolitan area network, wide area network, public network, private network, and the like.

The enterprise resources 204 may include email servers, file sharing servers, SaaS/Web applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 204 may be premise-based resources, cloud based resources, and the like. The enterprise resources 204 may be accessed by the client device 202 directly or through the access gateway 260. The enterprise resources 204 may be accessed by the client device 202 via a transport network 262. The transport network 262 may be a wired network, wireless network, cloud network, local area network, metropolitan area network, wide area network, public network, private network, and the like.

Cloud services can include an access gateway 260 and/or enterprise services 208. The enterprise services 208 may include authentication services 258, threat detection services 264, device manager services 224, file sharing services 268, policy manager services 270, social integration services 272, application controller services 274, and the like. Authentication services 258 may include user authentication services, device authentication services, application authentication services, data authentication services and the like. Authentication services 258 may use certificates. The certificates may be stored on the client device 202, by the enterprise resources 204, and the like. The certificates stored on the client device 202 may be stored in an encrypted location on the client device. The certificate may be temporarily stored on the client device 202 for use at the time of authentication, and the like. Threat detection services 264 may include intrusion detection services, unauthorized access attempt detection services, and the like. Unauthorized access attempt detection services may include unauthorized attempts to access devices, applications, data, and the like. Device management services 224 may include configuration, provisioning, security, support, monitoring, reporting, and decommissioning services. File sharing services 268 may include file management services, file storage services, file collaboration services, and the like. Policy manager services 270 may include device policy manager services, application policy manager services, data policy manager services, and the like. Social integration services 272 may include contact integration services, collaboration services, integration with social networks such as Facebook, Twitter, and LinkedIn, and the like. Application controller services 274 may include management services, provisioning services, deployment services, assignment services, revocation services, wrapping services, and the like.

The enterprise mobility technical architecture 200 may include an application store 278. The application store 278 may include unwrapped applications 280, pre-wrapped applications 282, and the like. Applications may be populated in the application store 278 from the application controller 274. The application store 278 may be accessed by the client device 202 through the access gateway 260, through the public Internet 248, or the like. The application store may be provided with an intuitive and easy to use User Interface.

A software development kit 284 may provide a user the capability to secure applications selected by the user by providing a secure wrapper around the application. An application that has been wrapped using the software development kit 284 may then be made available to the client device 202 by populating it in the application store 278 using the application controller 274.

The enterprise mobility technical architecture 200 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 3:
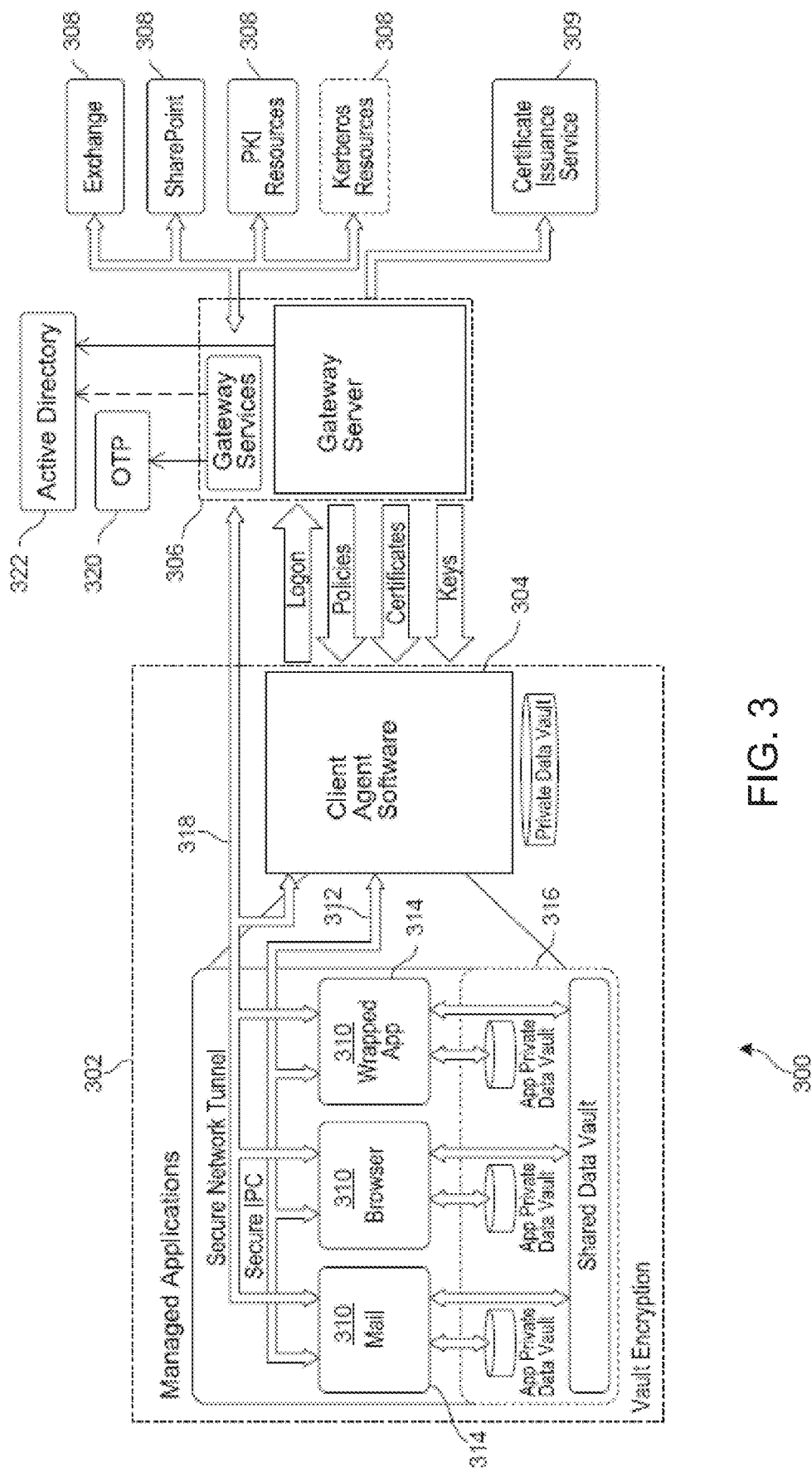
FIG. 3 is a block diagram of an example embodiment of an enterprise mobility management system.

FIG. 3 depicts is an illustrative embodiment of an enterprise mobility management system 300. Some of the components of the mobility management system 200 described above with reference to FIG. 2 have been omitted for the sake of simplicity. The architecture of the system 300 depicted in FIG. 3 is similar in many respects to the architecture of the system 200 described above with reference to FIG. 2 and may include additional features not mentioned above.

In this case, the left hand side represents an enrolled client device 302 with a client agent 304, which interacts with gateway server 306 to access various enterprise resources 308 and services 309 such as Web or SasS applications, Exchange, Sharepoint, public-key infrastructure (PKI) Resources, Kerberos Resources, Certificate Issuance service, as shown on the right hand side above. The gateway server 306 can include embodiments of features and functionalities of the cloud services, such as access gateway 260 and application controller functionality. Although not specifically shown, the client agent 304 may be part of, and/or interact with the client application which can operate as an enterprise application store (storefront) for the selection and/or downloading of network applications.

The client agent 304 can act as a UI (user interface) intermediary for Windows apps/desktops hosted in an Enterprise data center, which are accessed using the High-Definition User Experience (HDX) or Independent Computing Architecture (ICA) display remoting protocol. The client agent 304 can also support the installation and management of native applications on the client device 302, such as native iOS or Android applications. For example, the managed applications 310 (mail, browser, wrapped application) shown in the figure above are native applications that execute locally on the device. Client agent 304 and application management framework of this architecture act to provide policy driven management capabilities and features such as connectivity and SSO (single sign on) to enterprise resources/services 308. The client agent 304 handles primary user authentication to the enterprise, for instance to access gateway (AG) with SSO to other gateway server components. The client agent 304 obtains policies from gateway server 306 to control the behavior of the managed applications 310 on the client device 302.

The Secure interprocess communication (IPC) links 312 between the native applications 310 and client agent 304 represent a management channel, which allows client agent to supply policies to be enforced by the application management framework 314 "wrapping" each application. The IPC channel 312 also allows client agent 304 to supply credential and authentication information that enables connectivity and SSO to enterprise resources 308. Finally, the IPC channel 312 allows the application management framework 314 to invoke user interface functions implemented by client agent 304, such as online and offline authentication.

Communications between the client agent 304 and gateway server 306 are essentially an extension of the management channel from the application management framework 314 wrapping each native managed application 310. The application management framework 314 requests policy information from client agent 304, which in turn requests it from gateway server 306. The application management framework 314 requests authentication, and client agent 304 logs into the gateway services part of gateway server 306 (also known as NetScaler access gateway). Client agent 304 may also call supporting services on gateway server 306, which may produce input material to derive encryption keys for the local data vaults 316, or provide client certificates which may enable direct authentication to PKI protected resources, as more fully explained below.

In more detail, the application management framework 314 "wraps" each managed application 310. This may be incorporated via an explicit build step, or via a post-build processing step. The application management framework 314 may "pair" with client agent 304 on first launch of an application 310 to initialize the Secure IPC channel and obtain the policy for that application. The application management framework 314 may enforce relevant portions of the policy that apply locally, such as the client agent login dependencies and some of the containment policies that restrict how local OS services may be used, or how they may interact with the application 310.

The application management framework 314 may use services provided by client agent 304 over the Secure IPC channel 312 to facilitate authentication and internal network access. Key management for the private and shared data vaults 316 (containers) may be also managed by appropriate interactions between the managed applications 310 and client agent 304. Vaults 316 may be available only after online authentication, or may be made available after offline authentication if allowed by policy. First use of vaults 316 may require online authentication, and offline access may be limited to at most the policy refresh period before online authentication is again required.

Network access to internal resources may occur directly from individual managed applications 310 through access gateway 306. The application management framework 314 is responsible for orchestrating the network access on behalf of each application 310. Client agent 304 may facilitate these network connections by providing suitable time limited secondary credentials obtained following online authentication. Multiple modes of network connection may be used, such as reverse web proxy connections and end-to-end VPN-style tunnels 318.

The Mail and Browser managed applications 310 can have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture can support the incorporation of various other security features. For example, gateway server 306 (including its gateway services) in some cases might not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 306 may identify managed native applications 310 that are allowed to have access to more sensitive data using strong authentication, and ensure that access to these applications is only permitted after performing appropriate authentication, even if this means a re-authentication is requested from the user after a prior weaker level of login.

Another security feature of this solution is the encryption of the data vaults 316 (containers) on the client device 302. The vaults 316 may be encrypted so that all on-device data including clipboard/cache data, files, databases, and configurations are protected. For on-line vaults, the keys may be stored on the server (gateway server 306), and for off-line vaults, a local copy of the keys may be protected by a user password or biometric validation. When data is stored locally on the device 302 in the secure container 316, it is preferred that a minimum of AES 256 encryption algorithm be utilized.

Other secure container features may also be implemented. For example, a logging feature may be included, wherein all security events happening inside an application 310 are logged and reported to the backend. Data wiping may be supported, such as if the application 310 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector might cause multiple copies of the same encrypted data to yield different cipher text output, preventing both replay and cryptanalytic attacks. This may also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it is needed. For example, login credentials may be wiped from memory after login, and encryption keys and other data inside objective-C instance variables are not stored, as they may be easily referenced. Instead, memory may be manually allocated for these.

An inactivity timeout may be implemented via the CEB, wherein after a policy-defined period of inactivity, a user session is terminated.

Data leakage from the application management framework 314 may be prevented in other ways. For example, when an application 310 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 320 without the use of an AD (active directory) 322 password for access to one or more applications. In some cases, some users do not know (or are not permitted to know) their AD password, so these users may authenticate using an OTP 320 such as by using a hardware OTP system like SecurID (OTPs may be provided by different vendors also, such as Entrust or Gemalto). In some cases, after a user authenticates with a user ID, a text is sent to the user with an OTP 320. In some cases, this may be implemented only for online use, with a prompt being a single field.

An offline password may be implemented for offline authentication for those applications 310 for which offline use is permitted via enterprise policy. For example, an enterprise may want storefront to be accessed in this manner. In this case, the client agent 304 may require the user to set a custom offline password and the AD password is not used. Gateway server 306 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 310 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 304 may be retrieved by gateway server 306 and used in a keychain. Each managed application may have one associated client certificate, identified by a label that is defined in gateway server 306.

Gateway server 306 may interact with an Enterprise special purpose web service to support the issuance of client certificates to allow relevant managed applications to authenticate to internal PKI protected resources.

The client agent 304 and the application management framework 314 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate might never be present in the iOS keychain and might not be persisted except potentially in "online-only" data value that is strongly protected.

Mutual SSL or TLS may also be implemented to provide additional security by requiring that a client device 302 is authenticated to the enterprise, and vice versa. Virtual smart cards for authentication to gateway server 306 may also be implemented.

Both limited and full Kerberos support may be additional features. The full support feature relates to an ability to do full Kerberos login to Active Directory (AD) 322, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 310 is not running.

A multi-site architecture or configuration of enterprise application store and an application controller may be supported that allows users to be service from one of several different locations in case of failure.

In some cases, managed applications 310 may be allowed to access a certificate and private key via an API (example OpenSSL). Trusted managed applications 310 of an enterprise may be allowed to perform specific Public Key operations with an application's client certificate and private key. Various use cases may be identified and treated accordingly, such as when an application behaves like a browser and no certificate access is used, when an application reads a certificate for "who am I," when an application uses the certificate to build a secure session token, and when an application uses private keys for digital signing of important data (e.g., transaction log) or for temporary data encryption.

Figure 4:
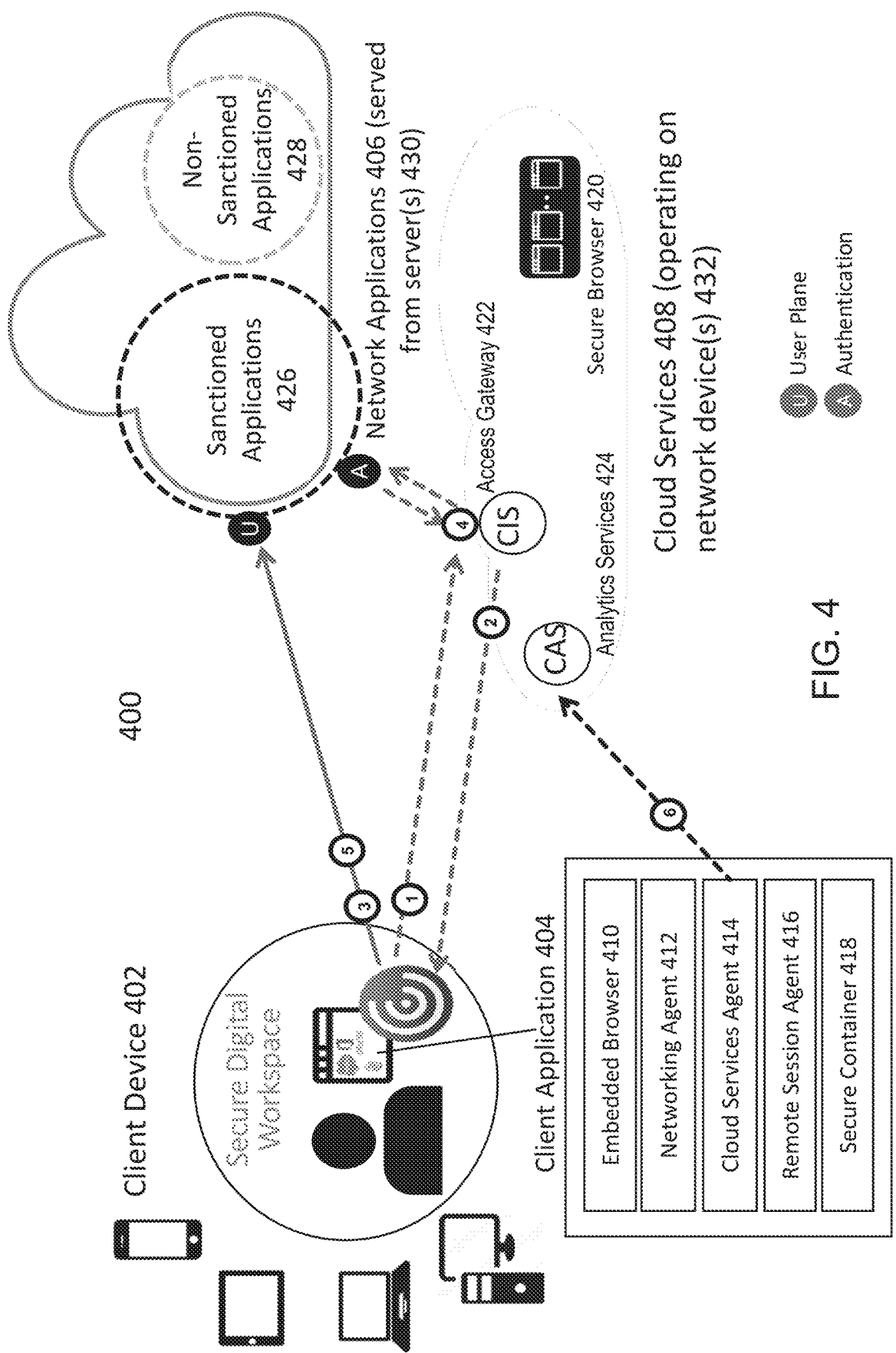
FIG. 4 is a block diagram of a system 400 of an embedded browser.

Referring now to FIG. 4, depicted is a block diagram of a system 400 of an embedded browser. In brief overview, the system 400 may include a client device 402 with a digital workspace for a user, a client application 404, cloud services 408 operating on at least one network device 432, and network applications 406 served from and/or hosted on one or more servers 430. The client application 404 can for instance include at least one of: an embedded browser 410, a networking agent 412, a cloud services agent 414, a remote session agent 416, or a secure container 418. The cloud services 408 can for instance include at least one of: secure browser(s) 420, an access gateway 422 (or CIS, e.g., for registering and/or authenticating the client application and/or user), or analytics services 424 (or CAS, e.g., for receiving information from the client application for analytics). The network applications 406 can include sanctioned applications 426 and non-sanctioned applications 428.

Each of the above-mentioned elements or entities is implemented in hardware, or a combination of hardware and software, in one or more embodiments. Each component of the system 200 may be implemented using hardware or a combination of hardware or software detailed above in connection with FIG. 1. For instance, each of these elements or entities can include any application, program, library, script, task, service, process or any type and form of executable instructions executing on hardware of the client device 402, the at least one network device 432 and/or the one or more servers 430. The hardware includes circuitry such as one or more processors in one or more embodiments. For example, the at least one network device 432 and/or the one or more servers 430 can include any of the elements of a computing device described above in connection with at least FIG. 1 for instance.

The client device 402 can include any embodiment of a computing device described above in connection with at least FIG. 1 for instance. The client device 402 can include any user device such as a desktop computer, a laptop computer, a tablet device, a smart phone, or any other mobile or personal device. The client device 402 can include a digital workspace of a user, which can include file system(s), cache or memory (e.g., including electronic clipboard(s)), container(s), application(s) and/or other resources on the client device 402. The digital workspace can include or extend to one or more networks accessible by the client device 402, such as an intranet and the Internet, including file system(s) and/or other resources accessible via the one or more networks. A portion of the digital workspace can be secured via the use of the client application 404 with embedded browser 410 (CEB) for instance. The secure portion of the digital workspace can include for instance file system(s), cache or memory (e.g., including electronic clipboard(s)), application(s), container(s) and/or other resources allocated to the CEB, and/or allocated by the CEB to network application(s) 406 accessed via the CEB. The secure portion of the digital workspace can also include resources specified by the CEB (via one or more policies) for inclusion in the secure portion of the digital workspace (e.g., a particular local application can be specified via a policy to be allowed to receive data obtained from a network application).

The client application 404 can include one or more components, such as an embedded browser 410, a networking agent 412, a cloud services agent 414 (sometimes referred to as management agent), a remote session agent 416 (sometimes referred to as HDX engine), and/or a secure container 418 (sometimes referred to as secure cache container). One or more of the components can be installed as part of a software build or release of the client application 404 or CEB, or separately acquired or downloaded and installed/integrated into an existing installation of the client application 404 or CEB for instance. For instance, the client device may download or otherwise receive the client application 404 (or any component) from the network device(s) 432. In some embodiments, the client device may send a request for the client application 404 to the network device(s) 432. For example, a user of the client device can initiate a request, download and/or installation of the client application. The network device(s) 432 in turn may send the client application to the client device. In some embodiments, the network device(s) 432 may send a setup or installation application for the client application to the client device. Upon receipt, the client device may install the client application onto a hard disk of the client device. In some embodiments, the client device may run the setup application to unpack or decompress a package of the client application. In some embodiments, the client application may be an extension (e.g., an add-on, an add-in, an applet or a plug-in) to another application (e.g., a networking agent 414) installed on the client device. The client device may install the client application to interface or inter-operate with the pre-installed application. In some embodiments, the client application may be a standalone application. The client device may install the client application to execute as a separate process.

The embedded browser 410 can include elements and functionalities of a web browser application or engine. The embedded browser 410 can locally render network application(s) as a component or extension of the client application. For instance, the embedded browser 410 can render a SaaS/Web application inside the CEB which can provide the CEB with full visibility and control of the application session. The embedded browser can be embedded or incorporated into the client application via any means, such as direct integration (e.g., programming language or script insertion) into the executable code of the client application, or via plugin installation. For example, the embedded browser can include a Chromium based browser engine or other type of browser engine, that can be embedded into the client application, using the Chromium embedded framework (CEF) for instance. The embedded browser can include a HTML5-based layout graphical user interface (GUI). The embedded browser can provide HTML rendering and JavaScript support to a client application incorporating various programming languages. For example, elements of the embedded browser can bind to a client application incorporating C, C++, Delphi, Go, Java, .NET/Mono, Visual Basic 6.0, and/or Python.

In some embodiments, the embedded browser comprises a plug-in installed on the client application. For example, the plug-in can include one or more components. One such components can be an ActiveX control or Java control or any other type and/or form of executable instructions capable of loading into and executing in the client application. For example, the client application can load and run an Active X control of the embedded browser, such as in a memory space or context of the client application. In some embodiments, the embedded browser can be installed as an extension on the client application, and a user can choose to enable or disable the plugin or extension. The embedded browser (e.g., via the plugin or extension) can form or operate as a secured browser for securing, using and/or accessing resources within the secured portion of the digital workspace.

The embedded browser can incorporate code and functionalities beyond that available or possible in a standard or typical browser. For instance, the embedded browser can bind with or be assigned with a secured container 418, to define at least part of the secured portion of a user's digital workspace. The embedded browser can bind with or be assigned with a portion of the client device's cache to form a secured clipboard (e.g., local to the client device, or extendable to other devices), that can be at least part of the secured container 418. The embedded browser can be integrated with the client application to ensure that traffic related to network applications is routed through and/or processed in the client application, which can provide the client application with real-time visibility to the traffic (e.g., when decrypted through the client application). This visibility to the traffic can allow the client application to perform or facilitate policy-based management (e.g., including data loss prevention (DLP) capabilities), application control, and collection and production of analytics.

In some embodiments, the embedded browser incorporates one or more other components of the client application 404, such as the cloud services agent 414, remote session agent 416 and/or secure container 418. For instance, a user can use the cloud services agent 414 of the embedded browser to interoperate with the access gateway 422 (sometimes referred to as CIS) to access a network application. For example, the cloud services agent 414 can execute within the embedded browser, and can receive and transmit navigation commands from the embedded browser to a hosted network application. The cloud services agent can use a remote presentation protocol to display the output generated by the network application to the embedded browser. For example, the cloud services agent 414 can include a HTML5 web client that allows end users to access remote desktops and/or applications on the embedded browser.

The client application 404 and CEB operates on the application layer of the operational (OSI) stack of the client device. The client application 404 can include and/or execute one or more agents that interoperate with the cloud services 408.

For example, the cloud services agent 414 can convey or feed information to analytics services 424 of the cloud services 408, such as information about SaaS interaction events visible to the CEB. Such a configuration using the CEB can monitor or capture information for analytics without having an inline device or proxy located between the client device and the server(s) 430, or using a SaaS API gateway 'out-of-band' approach. In some embodiments, the cloud services agent 414 does not execute within the embedded browser. In these embodiments, a user can similarly use the cloud services agent 414 to interoperate with the access gateway (or CIS) 422 to access a network application. For instance, the cloud services agent 414 can register and/or authenticate with the access gateway (or CIS) 422, and can obtain a list of the network applications from the access gateway (or CIS) 422. The cloud services agent 414 can include and/or operate as an application store (or storefront) for user selection and/or downloading of network applications. Upon logging in to access a network application, the cloud services agent 414 can intercept and transmit navigation commands from the embedded browser to the network application. The cloud services agent can use a remote presentation protocol to display the output generated by the network application to the embedded browser. For example, the cloud services agent 414 can include a HTML5 web client that allows end users to access remote desktops and/or applications on the embedded browser.

In some embodiments, the cloud services agent 414 provides single sign on (SSO) capability for the user and/or client device to access a plurality of network applications. The cloud services agent 414 can perform user authentication to access network applications as well as other network resources and services, by communicating with the access gateway 422 for instance. For example, the cloud services agent 414 can authenticate or register with the access gateway 422, to access other components of the cloud services 408 and/or the network applications 406. Responsive to the authentication or registration, the access gateway 422 can perform authentication and/or SSO for (or on behalf of) the user and/or client application, with the network applications.

In some embodiments, the cloud services agent 414 provides policy driven management capabilities and features related to the use and/or access of network applications. For example, the cloud services agent 414 can include a policy engine to apply one or more policies to determine access control and/or connectivity to resources such as network applications. When a session is established between the client application and a server 430 providing a SaaS application for instance, the cloud services agent 414 can apply one or more policies to control traffic levels and/or traffic types (or other aspects) of the session, for instance to manage a service level of the SaaS application. Additional aspects of the application traffic that can be controlled or managed can include encryption level and/or encryption type applied to the traffic, level of interactivity allowed for a user, limited access to certain features of the network application (e.g., print-screen, save, edit or copy functions), restrictions to use or transfer of data obtained from the network application, limit concurrent access to two or more network applications, limit access to certain file repositories or other resources, and so on.

The client application 404 can include a networking agent 412. The networking agent 412 is sometimes referred to as a software-defined wide area network (SD-WAN) agent, mVPN agent, or microVPN agent. The networking agent 412 can establish or facilitate establishment of a network connection between the client application and one or more resources (e.g., server 430 serving a network application). The networking agent 412 can perform handshaking for a requested connection from the client application to access a network application, and can establish the requested connection (e.g., secure or encrypted connection). The networking agent 412 can connect to enterprise resources (including services) for instance via a virtual private network (VPN). For example, the networking agent 412 can establish a secure socket layer (SSL) VPN between the client application and a server 430 providing the network application 406. The VPN connections, sometimes referred to as microVPN or application-specific VPN, may be specific to particular network applications, particular devices, particular secured areas on the client device, and the like, for instance as discussed above in connection with FIG. 3. Such VPN connections can carry Microsoft Exchange traffic, Microsoft Active Directory traffic, HyperText Transfer Protocol (HTTP) traffic, HyperText Transfer Protocol Secure (HTTPS) traffic, as some examples.

The remote session agent 416 (sometimes referred to as HDX engine) can include features of the client agent 304 discussed above in connection with FIG. 2 for instance, to support display a remoting protocol (e.g., HDX or ICA). In some embodiments, the remote session agent 416 can establish a remote desktop session and/or remote application session in accordance to any variety of protocols, such as the Remote Desktop Protocol (RDP), Appliance Link Protocol (ALP), Remote Frame Buffer (RFB) Protocol, and ICA Protocol. For example, the remote session agent 416 can establish a remote application session for a user of the client device to access an enterprise network application. The remote session agent 416 can establish the remote application session within or over a secure connection (e.g., a VPN) established by the networking agent 412 for instance.

The client application or CEB can include or be associated with a secure container 418. A secure container can include a logical or virtual delineation of one or more types of resources accessible within the client device and/or accessible by the client device. For example, the secure container 418 can refer to the entirety of the secured portion of the digital workspace, or particular aspect(s) of the secured portion. In some embodiments, the secure container 418 corresponds to a secure cache (e.g., electronic or virtual clipboard), and can dynamically incorporate a portion of a local cache of each client device of a user, and/or a cloud-based cache of the user, that is protected or secured (e.g., encrypted). The secure container can define a portion of file system(s), and/or delineate resources allocated to a CEB and/or to network applications accessed via the CEB. The secure container can include elements of the secure data container 228 discussed above in connection with FIG. 2 for example. The CEB can be configured (e.g., via policies) to limit, disallow or disable certain actions or activities on resources and/or data identified to be within a secure container. A secured container can be defined to specify that the resources and/or data within the secure container are to be monitored for misuse, abuse and/or exfiltration.

In certain embodiments, a secure container relates to or involves the use of a secure browser (e.g., embedded browser 410 or secure browser 420) that implements various enterprise security features. Network applications (or web pages accessed by the secure browser) that are configured to run within the secure browser can effectively inherit the security mechanisms implemented by the secure browser. These network applications can be considered to be contained within the secure container. The use of such a secure browser can enable an enterprise to implement a content filtering policy in which, for example, employees are blocked from accessing certain web sites from their client devices. The secure browser can be used, for example, to enable client device users to access a corporate intranet without the need for a VPN.

In some embodiments, a secure container can support various types of remedial actions for protecting enterprise resources. One such remedy is to lock the client device, or a secure container on the client device that stores data to be protected, such that the client device or secure container can only be unlocked with a valid code provided by an administrator for instance. In some embodiments, these and other types of remedies can be invoked automatically based on conditions detected on the client device (via the application of policies for instance), or can be remotely initiated by an administrator.

In some embodiments, a secure container can include a secure document container for documents. A document can comprise any computer-readable file including text, audio, video, and/or other types of information or media. A document can comprise any single one or combination of these media types. As explained herein, the secure container can help prevent the spread of enterprise information to different applications and components of the client device, as well as to other devices. The enterprise system (which can be partially or entirely within a cloud network) can transmit documents to various devices, which can be stored within the secure container. The secure container can prevent unauthorized applications and other components of the client device from accessing information within the secure container. For enterprises that allow users to use their own client devices for accessing, storing, and using enterprise data, providing secure container on the client devices helps to secure the enterprise data. For instance, providing secure containers on the client devices can centralize enterprise data in one location on each client device, and can facilitate selective or complete deletion of enterprise data from each client device when desired.

The secure container can include an application that implements a file system that stores documents and/or other types of files. The file system can comprise a portion of a computer-readable memory of the client device. The file system can be logically separated from other portions of the computer-readable memory of the client device. In this way, enterprise data can be stored in a secure container and private data can be stored in a separate portion of the computer-readable memory of the client device for instance. The secure container can allow the CEB, network applications accessed via the CEB, locally installed applications and/or other components of the client device to read from, write to, and/or delete information from the file system (if authorized to do so). Deleting data from the secure container can include deleting actual data stored in the secure container, deleting pointers to data stored in the secure container, deleting encryption keys used to decrypt data stored in the secure container, and the like. The secure container can be installed by, e.g., the client application, an administrator, or the client device manufacturer. The secure container can enable some or all of the enterprise data stored in the file system to be deleted without modifying private data stored on the client device outside of the secure container. The file system can facilitate selective or complete deletion of data from the file system. For example, an authorized component of the enterprise's system can delete data from the file system based on, e.g., encoded rules. In some embodiments, the client application can delete the data from the file system, in response to receiving a deletion command from the enterprise's system.

The secure container can include an access manager that governs access to the file system by applications and other components of the client device. Access to the file system can be governed based on document access policies (e.g., encoded rules) maintained by the client application, in the documents and/or in the file system. A document access policy can limit access to the file system based on (1) which application or other component of the client device is requesting access, (2) which documents are being requested, (3) time or date, (4) geographical position of the client device, (5) whether the requesting application or other component provides a correct certificate or credentials, (6) whether the user of the client device provides correct credentials, (7) other conditions, or any combination thereof. A user's credentials can comprise, for example, a password, one or more answers to security questions (e.g., What is the mascot of your high school?), biometric information (e.g., fingerprint scan, eye-scan), and the like. Hence, by using the access manager, the secure container can be configured to be accessed only by applications that are authorized to access the secure container. As one example, the access manager can enable enterprise applications installed on the client device to access data stored in the secure container and to prevent non-enterprise applications from accessing the data stored in the secure container.

Temporal and geographic restrictions on document access may be useful. For example, an administrator may deploy a document access policy that restricts the availability of the documents (stored within the secure container) to a specified time window and/or a geographic zone (e.g., as determined by a GPS chip) within which the client device=must reside in order to access the documents. Further, the document access policy can instruct the secure container or client application to delete the documents from the secure container or otherwise make them unavailable when the specified time period expires or if the client device is taken outside of the defined geographic zone.

Some documents can have access policies that forbid the document from being saved within the secure container. In such embodiments, the document can be available for viewing on the client device only when the user is logged in or authenticated via the cloud services for example.

The access manager can also be configured to enforce certain modes of connectivity between remote devices (e.g., an enterprise resource or other enterprise server) and the secure container. For example, the access manager can require that documents received by the secure container from a remote device and/or sent from the secure container to the remote device be transmitted through secured tunnels/connections, for example. The access manager can require that all documents transmitted to and from the secure container be encrypted. The client application or access manager can be configured to encrypt documents sent from the secure container and decrypt documents sent to the secure container. Documents in the secure container can also be stored in an encrypted form.

The secure container can be configured to prevent documents or data included within documents or the secure container from being used by unauthorized applications or components of the client device or other devices. For instance, a client device application having authorization to access documents from the secure container can be programmed to prevent a user from copying a document's data and pasting it into another file or application interface, or locally saving the document or document data as a new file outside of the secure container. Similarly, the secure container can include a document viewer and/or editor that do not permit such copy/paste and local save operations. Moreover, the access manager can be configured to prevent such copy/paste and local save operations. Further, the secure container and applications programmed and authorized to access documents from the secure container can be configured to prevent users from attaching such documents to emails or other forms of communication.

One or more applications (e.g., applications installed on the client device, and/or network applications accessed via the CEB) can be programmed or controlled (e.g., via policy-based enforcement) to write enterprise-related data only into the secure container. For instance, an application's source code can be provided with the resource name of the secure container. Similarly, a remote application (e.g., executing on a device other than the client device) can be configured to send data or documents only to the secure container (as opposed to other components or memory locations of the client device). Storing data to the secure container can occur automatically, for example, under control of the application, the client application, and/or the secure browser. The client application can be programmed to encrypt or decrypt documents stored or to be stored within the secure container. In certain embodiments, the secure container can only be used by applications (on the client device or a remote device) that are programmed to identify and use the secure container, and which have authorization to do so.

The network applications 406 can include sanctioned network applications 426 and non-sanctioned network applications 428. By way of a non-limiting example, sanctioned network applications 426 can include network applications from Workday, Salesforce, Office 365, SAP, and so on, while non-sanctioned network applications 426 can include network applications from Dropbox, Gmail, and so on. For instance, FIG. 4 illustrates a case where sanctioned applications 426 are accessed via a CEB. In operation (1), a user instance of a client application 404, that is installed on client device 402, can register or authenticate with the access gateway 422 of cloud services 408. For example, the user can authenticate the user to the client device and login to the client device 402. The client application can automatically execute, or be activated by the user. In some embodiments, the user can sign in to the client application (e.g., by authenticating the user to the client application). In response to the login or sign-in, the client application can register or authenticate the user and/or the client application with the access gateway 422.

In operation (2), in response to the registration or authentication, the access gateway 422 can identify or retrieve a list of enumerated network applications available or pre-assigned to the user, and can provide the list to the client application. For example, in response to the registration or authentication, the access gateway can identify the user and/or retrieve a user profile of the user. According to the identity and/or user profile, the access gateway can determine the list (e.g., retrieve a stored list of network applications matched with the user profile and/or the identity of the user). The list can correspond to a list of network applications sanctioned for the user. The access gateway can send the list to the client application or embedded browser, which can be presented via the client application or embedded browser to the user (e.g., in a storefront user interface) for selection.

In operation (3), the user can initiate connection to a sanctioned network application (e.g., a SaaS application), by selecting from the list of network applications presented to the user. For example, the user can click on an icon or other representation of the sanctioned network application, displayed via the client application or embedded browser. This user action can trigger the CEB to transmit a connection or access request to a server that provisions the network application. The request can include a request to the server (e.g., SaaS provider) to communicate with the access gateway to authenticate the user. The server can send a request to the access gateway to authenticate the user for example.

In operation (4), the access gateway can perform SSO with the server, to authenticate the user. For example, in response to the server's request to authenticate the user, the access gateway can provide credentials of the user to the server(s) 430 for SSO, to access the selected network application and/or other sanctioned network applications. In operation (5), the user can log into the selected network application, based on the SSO (e.g., using the credentials). The client application (e.g., the networking agent 412 and/or the remote session agent 416) can establish a secure connection and session with the server(s) 430 to access the selected network application. The CEB can decrypt application traffic received via the secure connection. The CEB can monitor traffic sent via the CEB and the secured connection to the servers 430.

In operation (6), the client application can provide information to the analytics services 424 of cloud services 408, for analytics processing. For example, the cloud services agent 414 of the client application 404 can monitor for or capture user interaction events with the selected network application. The cloud services agent 414 can convey the user interaction events to the analytics services 424, to be processed to produce analytics.

Figure 5:
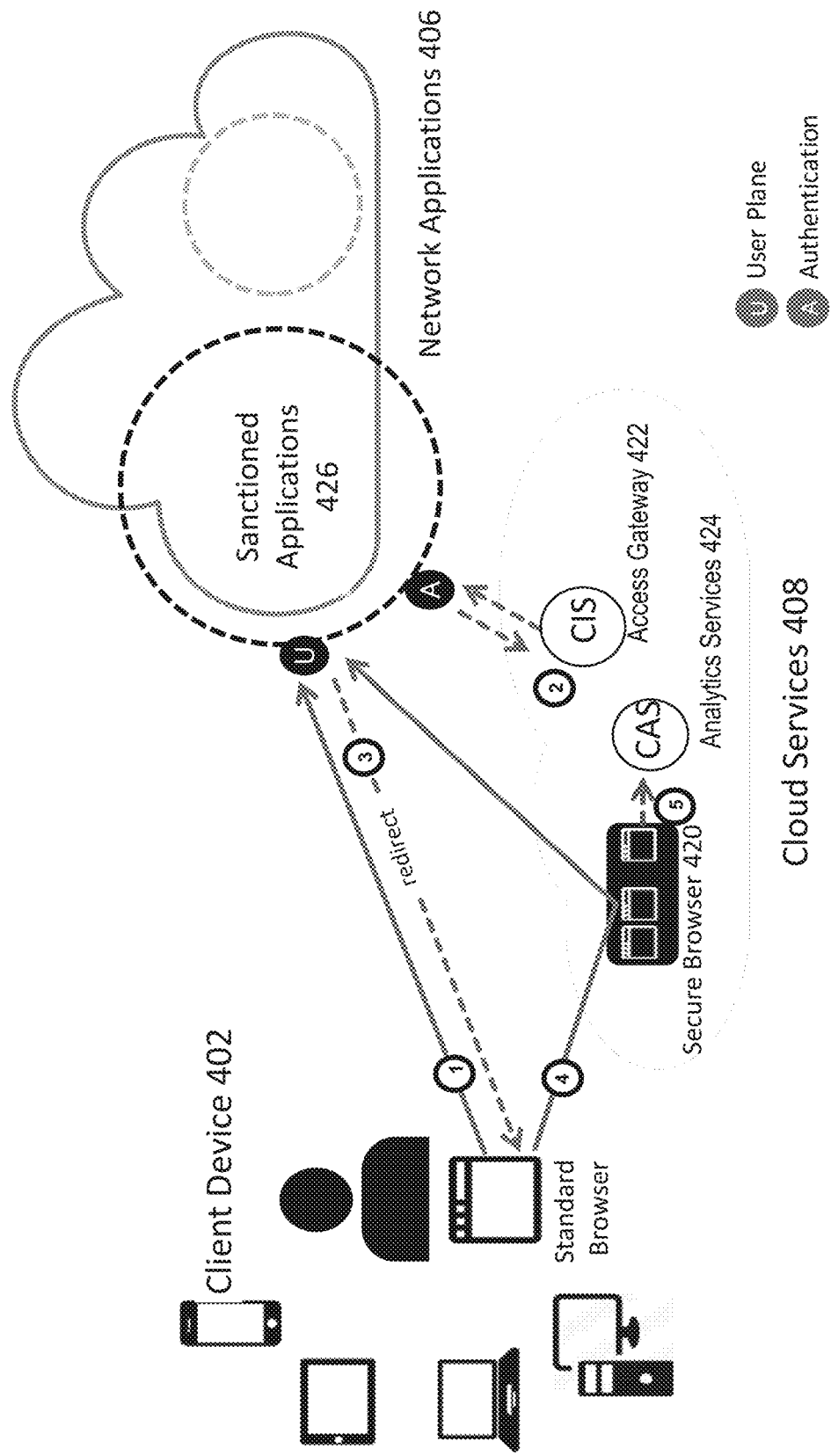
FIG. 5 is a block diagram of an example embodiment of a system for using a secure browser.

FIG. 5 depicts an example embodiment of a system for using a secure browser. In brief overview, the system includes cloud services 408, network applications 406 and client device 402. In some embodiments, various elements of the system are similar to that described above for FIG. 4, but that the client application (with embedded browser) is not available in the client device 402. A standard or typical browser may be available on the client device, from which a user can initiate a request to access a sanctioned network application for instance. A network application can be specified as being sanctioned or unsanctioned via policies that can be set by an administrator or automatically (e.g., via artificial intelligence).

For example, in operation (1), the user may log into the network application using the standard browser. For accessing a sanctioned network application, the user may access a predefined URL and/or corresponding webpage of a server that provisions the network application, via the standard browser, to initiate a request to access the network application. In some embodiments, the request can be forwarded to or intercepted by a designated gateway service (e.g., in a data path of the request). For example, the gateway service can reside on the client device (e.g., as an executable program), or can reside on a network device 432 of the cloud services 408 for instance. In some embodiments, the access gateway can correspond to or include the gateway service. The gateway service can determine if the requested network application is a sanctioned network application. The gateway service can determine if a CEB initiated the request. The gateway service can detect or otherwise determine that the request is initiated from a source (e.g., initiated by the standard browser) in the client device other than a CEB. In some embodiments, there is no requirement for a designated gateway service to detect or determine if the request is initiated from a CEB, for example if the requested network application is sanctioned, that user is initiating the request via a standard browser, and/or that the predefined URL and/or corresponding webpage is accessed.

In operation (2), the server may authenticate the user via the access gateway of the cloud services 408. The server may communicate with the access gateway to authenticate the user, in response to the request. For instance, the request can include an indication to the server to communicate with the access gateway to authenticate the user. In some embodiments, the server is pre-configured to communicate with the access gateway to authenticate the user, for requests to access a sanctioned network application. The server may send a request to the access gateway to authenticate the user. In response to the server's request to authenticate the user, the access gateway can provide credentials of the user to the server 430.

In operation (3), the gateway service and/or the server can direct (or redirect) all traffic to a secure browser 420 which provides a secure browsing service. This may be in response to at least one of: a determination that the requested network application is a sanctioned network application, a determination that the request is initiated from a source other than a CEB, a determination that the requested network application is sanctioned, a determination that user is initiating the request via a standard browser, and/or a determination that the predefined URL and/or corresponding webpage is accessed.

The user's URL session can be redirected to the secure browser. For example, the server, gateway service and/or the access gateway can generate and/or send a URL redirect message to the standard browser, responsive to the determination. The secure browser plug-in of the standard browser can receive the URL redirect message, and can for example send a request to access the non-sanctioned network application, to the secure browser 420. The secure browser 420 can direct the request to the server of the non-sanctioned network application. The URL redirect message can instruct the standard browser (and/or the secure browser plug-in) to direct traffic (e.g., destined for the network application) from the standard browser to the secure browser 420 hosted on a network device. This can provide clientless access and control via dynamic routing though a secure browser service. In some embodiments, a redirection of all traffic to the secure browser 420 is initiated or configured, prior to performing authentication of the user (e.g., using SSO) with the server.

In some embodiments, the gateway service can direct or request the server of the requested network application to communicate with the secure browser 420. For example, the gateway service can direct the server and/or the secure browser to establish a secured connection between the server and the secure browser, for establishing an application session for the network application.

In some embodiments, the secured browser 420 comprises a browser that is hosted on a network device 432 of the cloud services 408. The secured browser 420 can include one or more features of the secured browser 420 described above in connection with at least FIG. 4 for instance. The hosted browser can include an embedded browser of a CEB that is hosted on the network device 432 instead of on the client device. The hosted browser can include an embedded browser of a hosted virtualized version of the CEB that is hosted on the network device 432. Similar to the CEB installed on the client device, traffic is routed through the CEB hosted on the network device, which allows an administrator to have visibility of the traffic through the CEB and to remain in control for security policy control, analytics, and/or management of performance.

Figure 6:
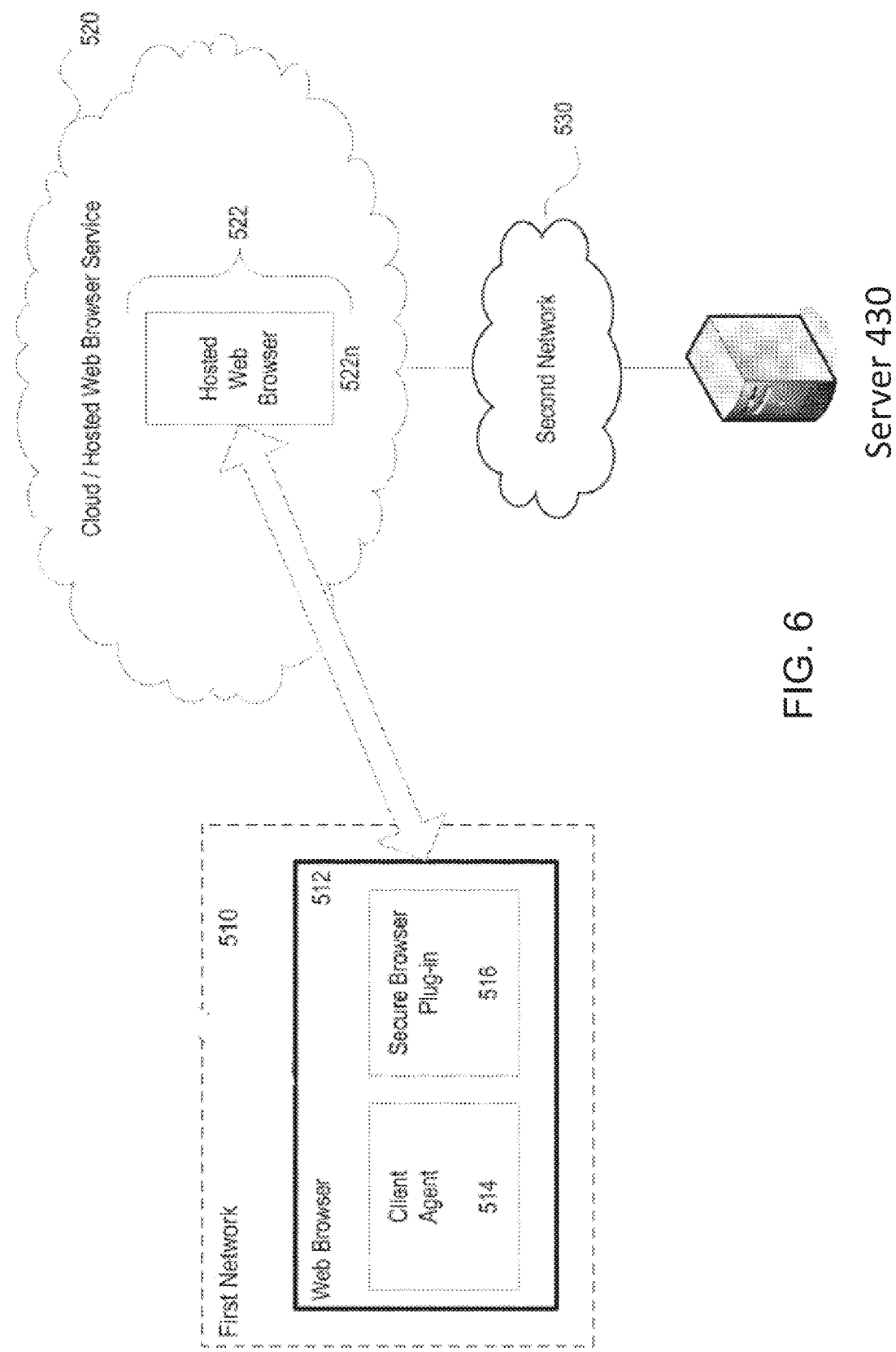

FIG. 6 illustrates an example implementation for browser redirection using a secure browser plug-in. In brief overview, the implementation includes a web browser 512 with a secure browser plug-in 516 operating on a client device, and a hosted web browser (or secure browser) 522 residing on a network device. The web browser 512 can correspond to a standard browser, instead of an embedded browser as discussed above in connection with FIG. 4 for example. The secure browser plug-in 516 can execute within a first network 510 and access a server 532 in a second network 530. The first network 510 and the second network 530 are for illustration purposes and may be replaced with fewer or additional computer networks. A secure browser plug-in 516 can be installed on the standard browser 512. The plug-in can include one or more components. One such component can include an ActiveX control or Java control or any other type and/or form of executable instructions capable of loading into and executing in the standard browser. For example, the standard browser can load and run an Active X control of the secure browser plug-in 516, in a memory space or context of the standard browser. In some embodiments, the secure browser plug-in can be installed as an extension on the standard browser, and a user can choose to enable or disable the plugin or extension. The secure browser plug-in can communicate and/or operate with the secured browser 420 for securing, using and/or accessing resources within the secured portion of the digital workspace.

By using the secure browser plug-in 516 operating within the standard browser 512 network applications accessed via the standard browser 512 can be redirected to a hosted secure browser. For instance, the secure browser plug-in 516 can be implemented and/or designed to detect that a network application is being accessed via the standard browser, and can direct/redirect traffic from the client device associated with the network application, to the hosted secure browser. The hosted secure browser can direct traffic received from the network application, to the secure browser plug-in 516 and/or a client agent 514 for rendering and/or display for example. The client agent 514 can execute within the web browser 512 and/or the secure browser plug-in, and can include certain elements or features of the client application 404 discussed above in connection with at least FIG. 4 for example. For instance, the client agent 514 can include a remote session agent 418 for rendering the network application at the web browser 512. In some embodiments, the network application is rendered at the hosted secure browser, and the rendered data is conveyed or mirrored to the secure browser plug-in 516 and/or the client agent 514 for processing and/or display.

By way of an example, a user may be working remotely and may want to access a network application that is internal to a secure corporate network while the user is working on a computing device connected to an unsecure network. In this case, the user may be utilizing the standard browser 512 executing in the first network 510, in which the first network 510 may comprise an unsecure network. The server 430 that the user wants to access may be on the second network 530, in which the second network 530 comprises a secure corporate network for instance. The user might not be able to access the server 430 from the unsecure first network 510 by clicking on an internal uniform record locator (URL) for the secure website 532. That is, the user may need to utilize a different URL (e.g., an external URL) while executing the standard browser 512 from the external unsecure network 510. The external URL may be directed to or may address one or more hosted web browsers 522 configured to access server(s) 430 within the second network 530 (e.g., secure network). To maintain secure access, the secure browser plug-in 516 may redirect an internal URL to an external URL for a hosted secure browser.

The secure browser plug-in 516 may be able to implement network detection in order to identify whether or not to redirect internal URLs to external URLs. The standard browser 512 may receive a request comprising an internal URL for a website executing within the secure network. For example, the standard browser 512 may receive the request in response to a user entering a web address (e.g., for secure website 532) in the standard browser. The secure browser plug-in 516 may redirect the user web browser application 512 from the internal URL to an external URL for a hosted web browser application. For example, the secure browser plug-in 516 may replace the internal URL with an external URL for the hosted web browser application 522 executing within the secure network 530.

The secure browser plug-in 516 may allow the client agent 514 to be connected to the hosted web browser application 522. The client agent 514 may comprise a plug-in component, such as an ActiveX control or Java control or any other type and/or form of executable instructions capable of loading into and executing in the standard browser 512. For example, the client agent 514 may comprise an ActiveX control loaded and run by a standard browser 512, such as in the memory space or context of the user web browser application 512. The client agent 514 may be pre-configured to present the content of the hosted web browser application 522 within the user web browser application 512.

The client agent 514 may connect to a server or the cloud/hosted web browser service 520 using a thin-client or remote-display protocol to present display output generated by the hosted web browser application 522 executing on the service 520. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

The hosted web browser application 522 may navigate to the requested network application in full-screen mode, and can render the requested network application. The client agent 514 may present the content or rendition of the network application on the web browser application 512 in a seamless and transparent manner such that it appears that the content is being displayed by the standard browser 512, e.g., based on the content being displayed in full screen mode. In other words, the user may be given the impression that the web site content is displayed by the user web browser application 512 and not by the hosted web browser application 522. The client agent 514 may transmit navigation commands generated by the user web browser application 512 to the hosted web browser application 522 using the thin-client or remote-display protocol. Changes to the display output of the hosted web browser application 522, due to the navigation commands, may be reflected in the user web browser application 512 by the client agent 514, giving the impression to the user that the navigation commands were executed by the user web browser application 512.

Referring again to FIG. 5, and in operation (4), a new browser tab can open on the standard browser, to render or display the secure browser session. The new browser tab can be established or opened by the secure browser plug-in for instance. The secure browser plug-in and/or a client agent can receive data from the secure browser session, and can render the network application within the new browser tab as discussed above in connection with FIG. 6 for instance.

In operation (5), the secure browser can feed all user interaction events via the network application, back to analytics service for processing. The secure browser plug-in can monitor for and intercept any user interaction events directed to the rendition of the network application within the browser tab. Hence, a user can use a native (or standard) browser to access a network application while allowing visibility into the network application's traffic, via the interoperation of cloud services and a secure browser (in the absence of the client application).

Figure 7:
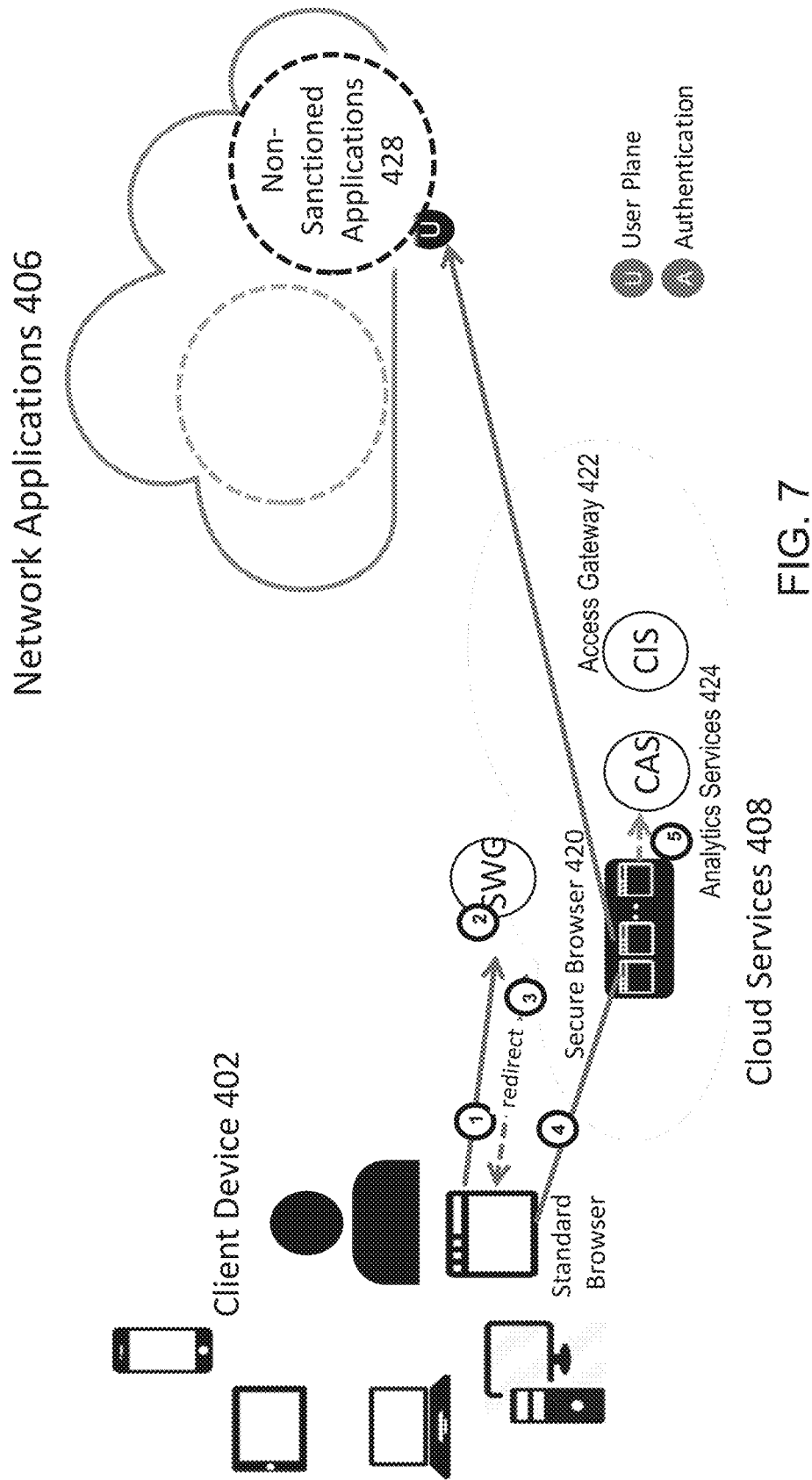
FIG. 7 is a block diagram of an example embodiment of a system of using a secure browser.

FIG. 7 depicts another example embodiment of a system of using a secure browser. In brief overview, the system includes cloud services 408, network applications 406 and the client device 402. In some embodiments, various elements of the system are similar to that described above for FIG. 5. A client application with embedded browser is not available in the client device 402. A standard or typical (e.g., HTML5) browser is available on the client device, from which a user can initiate a request to access a non-sanctioned network application. A network application can be specified as being sanctioned or non-sanctioned via policies that can be set by an administrator or automatically (e.g., via artificial intelligence).

In operation (1), the user may attempt to log into a non-sanctioned network application using the standard browser. The user may attempt to access a webpage of a server that provisions the network application, and to initiate a request to access the network application. In some embodiments, the request can be forwarded to or intercepted by a designated gateway service (e.g., in a data path of the request). For example, the gateway service (sometimes referred to as SWG) can reside on the client device (e.g., as an executable program), or can reside on a network device 432 of the cloud services 408 for instance. The gateway service can detect or otherwise determine if the requested network application is a sanctioned network application. The gateway service can determine if a CEB initiated the request. The gateway service can detect or otherwise determine that the request is initiated from a source (e.g., initiated by the standard browser) in the client device other than a CEB.

In operation (2), the gateway service detects that the requested network application is a non-sanctioned network application. The gateway service can for instance extract information from the request (e.g., destination address, name of the requested network application), and compare the information against that from a database of sanctioned and/or non-sanctioned network applications. The gateway service can determine, based on the comparison, that the requested network application is a non-sanctioned network application.

In operation (3), responsive to the determination, the gateway service can block access to the requested network application, e.g., by blocking the request. The gateway service can generate and/or send a URL redirect message to the standard browser, responsive to the determination. The URL redirect message can be similar to a URL redirect message sent from the server to the standard browser in FIG. 5 in operation (3). A secure browser plug-in of the standard browser can receive the URL redirect message, and can for example send a request to access the non-sanctioned network application, to the secure browser 420. The secure browser 420 can direct the request to the server of the non-sanctioned network application.

The server of the non-sanctioned network application may authenticate the user via the access gateway of the cloud services 408, e.g., responsive to receiving the request from the secure browser. The server may communicate with the access gateway to authenticate the user, in response to the request. The server may send a request to the access gateway to authenticate the user. In response to the server's request to authenticate the user, the access gateway can provide credentials of the user to the server 430. Upon authentication, the secure browser (or a corresponding CEB) can establish a secured connection and an application session with the server.

In operation (4), a new browser tab can open on the standard browser, to render or display the secure browser's application session. The new browser tab can be established or opened by the secure browser plug-in for instance. The secure browser plug-in and/or a client agent can receive data from the secure browser session, and can render the network application within the new browser tab as discussed above in connection with FIGS. 5-6 for instance.

In operation (5), the secure browser can feed all user interaction events via the network application, back to analytics service for processing. The secure browser plug-in can monitor for and intercept any user interaction events directed to the rendition of the network application within the browser tab. Hence, a user can use a native (or standard) browser to access a network application while allowing visibility into the network application's traffic, via the inter-operation of cloud services and a secure browser (in the absence of the client application).

In some embodiments, in the absence or non-availability of a CEB on the client device, browser redirection is performed so that each requested network application is accessed via a corresponding hosted secure browser (or hosted CEB) for handling, instead of having all traffic redirected through a single hosted secure browser (or hosted CEB). Each dedicated secure browsers can provide compartmentalization and improved security.

The use of a CEB, whether hosted or local to the client device, can allow for end-to-end visibility of application traffic for analytics, service level agreement (SLA), resource utilization, audit, and so on. In addition to such visibility, the CEB can be configured with policies for managing and controlling any of these as well as other aspects. For example, DLP features can be supported, to control "copy and paste" activities, download of files, sharing of files, and to implement watermarking for instance. As another example, the CEB can be configured with policies for managing and controlling access to local drives and/or device resources such as peripherals.

Figure 8:
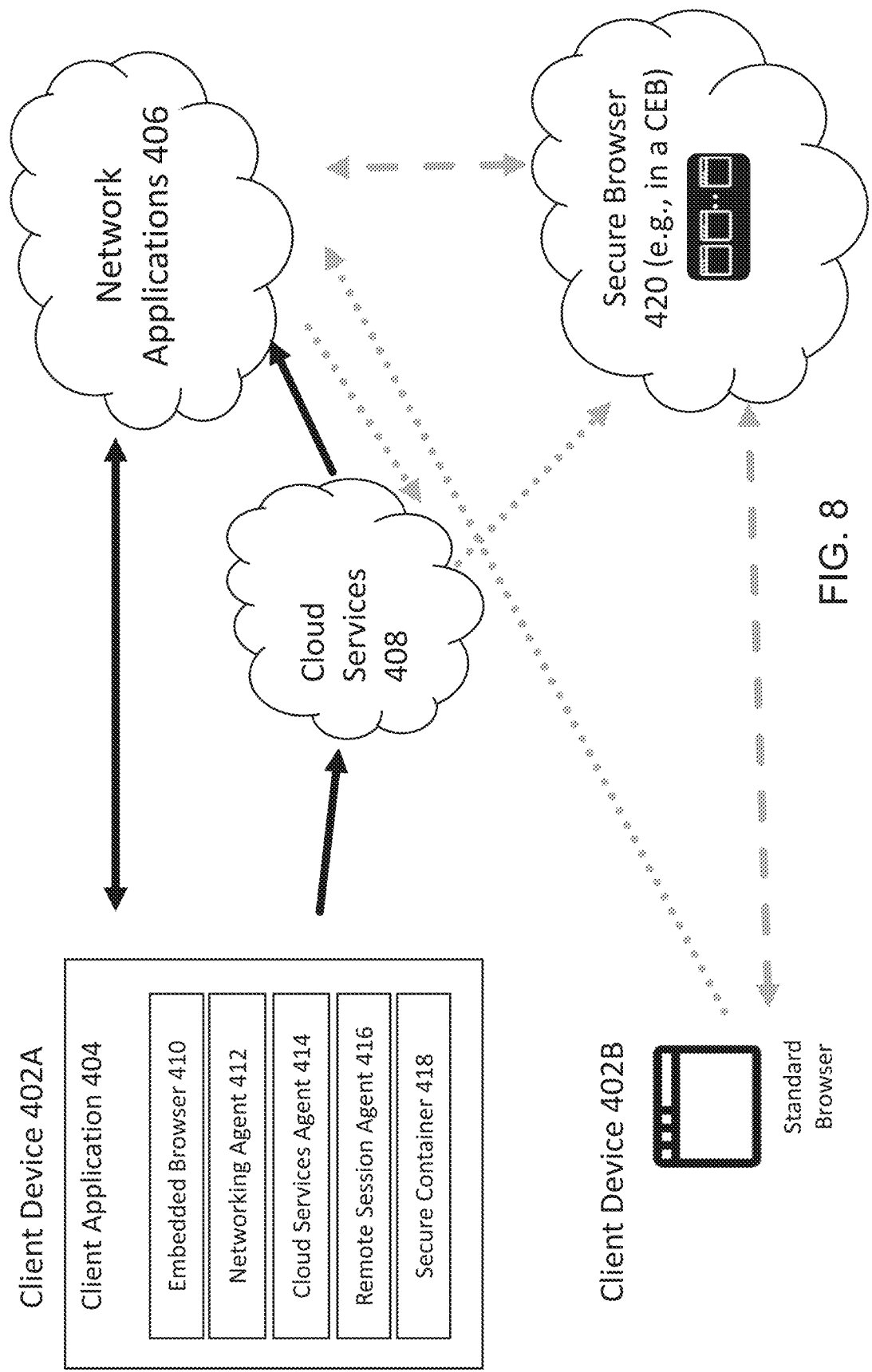
FIG. 8 is a block diagram of an example embodiment of a system for using local embedded browser(s) and hosted secured browser(s)

Referring now to FIG. 8, an example embodiment of a system for using local embedded browser(s) and hosted secured browser(s) is depicted. An environment is shown where different types of client devices 402A, 402B may be used (e.g., in a BYOD context), such that one may be locally equipped with a suitable CEB, and another client device may not have a suitable local CEB installed. In such an environment, systems described in FIGS. 4, 5 and 7 can be used to support each client devices based on the availability of a locally installed and suitable CEB.

Figure 9:
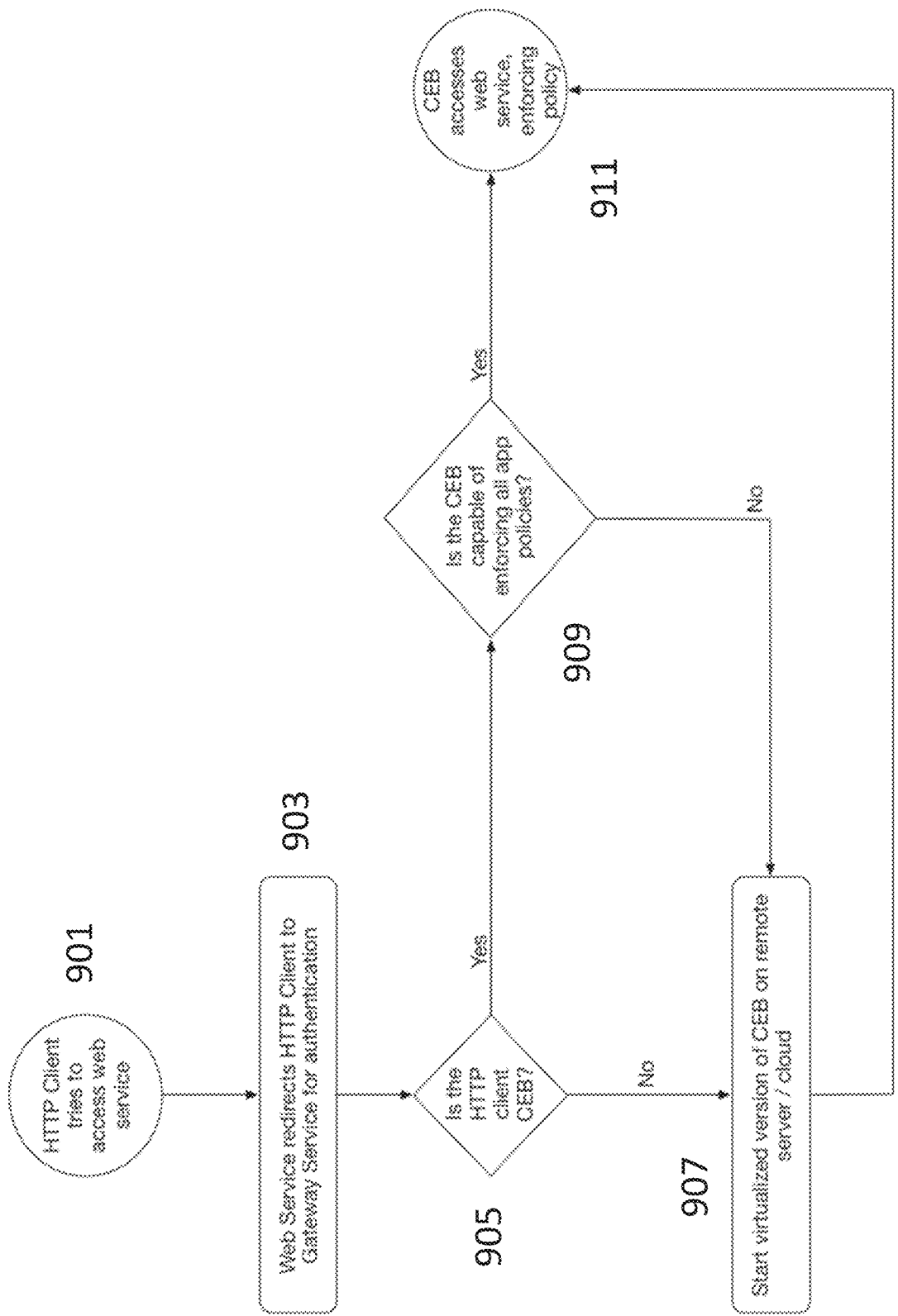
FIG. 9 is an example process flow for using local embedded browser(s) and hosted secured browser(s)

FIG. 9 depicts an example process flow for using local embedded browser(s) and hosted secured browser(s). The process flow can be used in the environment described above in FIG. 8, to determine whether an embedded browser or a hosted secured browser should be used for each client device to access a network application. For example, in operation 901, a HTTP client can attempt to access a web service (e.g., server of a network application). In operation 903, the web service can redirect the HTTP client to a gateway service for authentication. In operation 906, the gateway service can determine if the HTTP client is a CEB. If so, in operation 909, the gateway service can determine if the CEB is a suitable CEB, e.g., capable of enforcing defined application policies. If so, in operation 911, the CEB is allowed access to the web service, and can enforce the defined policies.

If the gateway service determines that the HTTP client is not a CEB, the gateway service can cause a virtualized version of a CEB to be initialized and hosted on a remote server (e.g., a network device 432 of cloud services 408), in operation 907. In some embodiments, such a hosted CEB may already be available on a network device 432, and can be selected for use. For example in operation 911, the CEB is allowed access to the web service, and can enforce the defined policies.

If the gateway service determines that the HTTP client is a CEB, but that the CEB is not a suitable CEB, the gateway service can cause a virtualized version of a CEB to be initialized and hosted on a remote server (e.g., a network device 432 of cloud services 408), in operation 907. In some embodiments, such a hosted CEB may already be available on a network device 432, and can be selected for use. For example in operation 911, the CEB is allowed access to the web service, and can enforce the defined policies.

In some embodiments, if the user is requesting access to a web application located in a company data center, the gateway service (in cloud service or on premise) can allow access when the client application with CEB is detected. Otherwise, the request can be routed to a service with the hosted virtualized version of the CEB, and then access is authenticated and granted.

At operation 905 and/or operation 909 for instance, the decisions made on whether the HTTP client is a CEB and whether it is a suitable CEB may be determined by a number of factors. For example, to determine if the HTTP client is CEB, the gateway service may take into account factors, for example including at least one of: user Identity and strength of authentication, client Location, client IP Address, how trusted the user identity, client location, client IP are, jailbreak status of the client device, status of anti-malware software, compliance to corporate policy of the client device, and/or remote attestation or other evidence of integrity of the client software.

To determine if the CEB is able to honor or support all defined application policies (which may vary by client version, client OS platform and other factors), the client device's software and gateway service may perform capability negotiation and/or exchange version information. In some embodiments, the gateway service can query or check a version number or identifier of the CEB to determine if the CEB is a suitable CEB to use.

Driving all the traffic though the CEB then allows additional control of content accessing SaaS and Web based systems. Data Loss Prevention (DLP) of SaaS and Web traffic can be applied through the CEB app with features including copy and paste control to other CEB access applications or IT managed devices. DLP can also be enforced by enabling content to be downloaded only to designated file servers or services under IT control.

Figure 10:
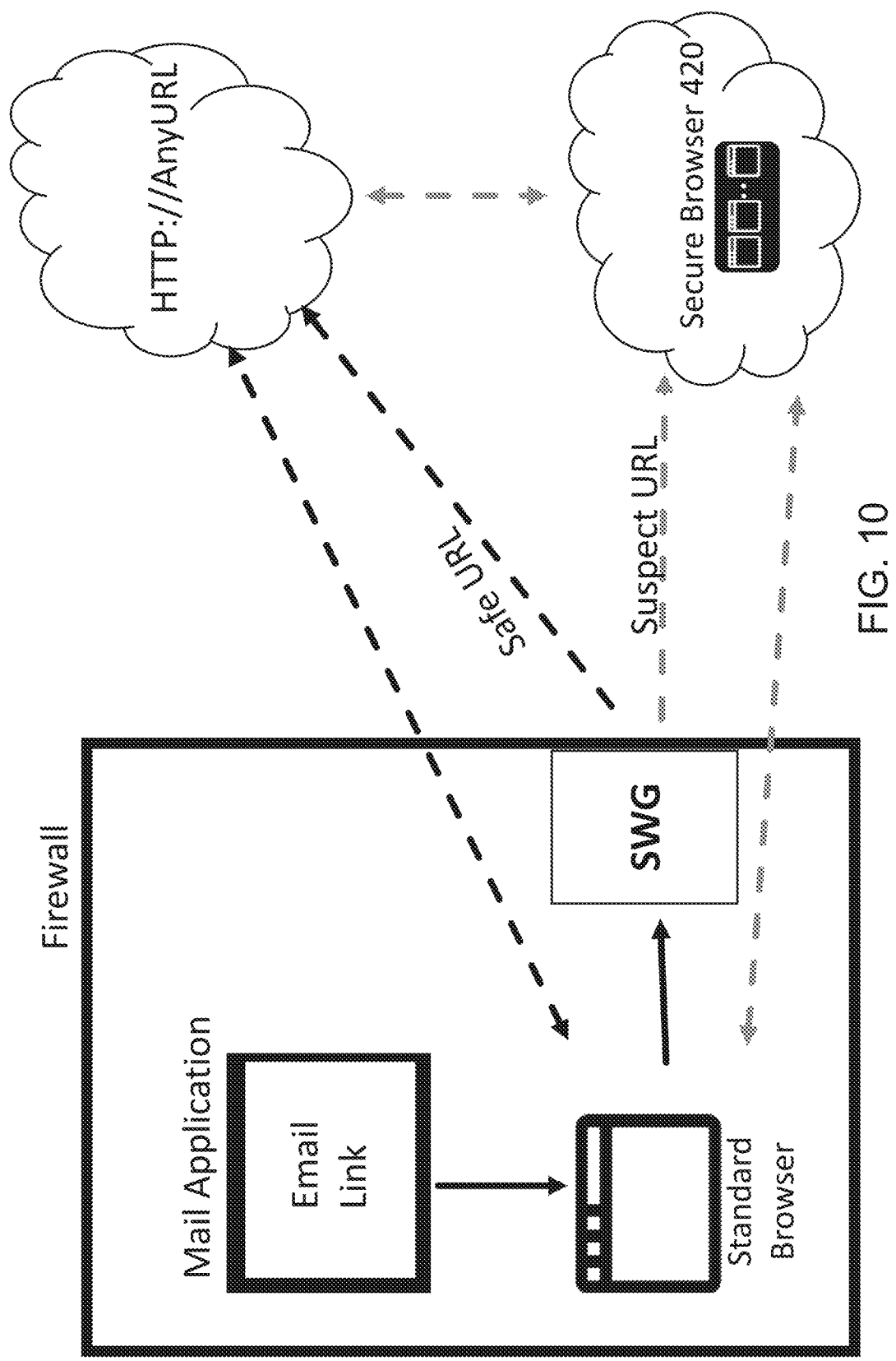
FIG. 10 is an example embodiment of a system for managing user access to webpages.

Referring now to FIG. 10, depicted is an example embodiment of a system for managing user access to webpages. Some webpages (or websites) are known to be safe while others may be suspect. A user may access a webpage via a corresponding URL through a standard browser. For example, the user may click on a link corresponding to the URL, which may be included in an email being viewed using a mail application. An access gateway (SWG) may intercept an access request generated by the clicking of the link, and can determine if the corresponding URL is safe or suspect. If the URL is known to be safe, the access gateway can allow the request to proceed to the corresponding website or web server. If the URL is suspect, the access gateway can redirect the request to be handled via a hosted secure browser. The secure browser can request access for, and access the webpage (on behalf of the standard browser), and can allow the webpage information to be conveyed to the standard browser, similar to the handling of a network application via browser redirection as discussed in connection with at least FIGS. 7 and 5.

C. Systems and Methods for Adding Watermarks Using an Embedded Browser

The present disclosure is directed towards systems and methods for adding watermarks using an embedded browser. To provide protection to sensitive information from a network application rendered via an embedded browser of a client application, the client application can generate an overlay with a digital watermark, and apply the overlay over the embedded browser. The client application can selectively generate such overlays, and can customize the format of the digital watermark according to the information rendered on the embedded browser. The watermark can remain with any information that is imaged from the embedded browser, and provides a deterrent against misuse of the information via image capture from a computer screen for instance. By adjusting properties (e.g., contrast) of such an image, the watermark can be made visible and detectable, thus allowing such imaging activities and information to be tracked.

Typical ways of providing a user with access to web and SaaS applications offers limited ability for an administrator to protect an enterprise against misuse of content after the content is displayed in a conventional browser. The use of secure containers can restrict copy and paste or downloads of content. However, for certain sensitive or confidential information present in the content, it may be beneficial to watermark the content with particular information such as a user's name and/or confidentiality requirement for the information. The watermark can be incorporated in a semi-transparent or visually transparent overlay of the content. This watermark can act as a user deterrence for misuse of information in the content if the computer display was to be photographed with sensitive or confidential content displayed.

Embodiments of the present systems and methods can provide an administrator with a controlled solution and mechanism for adding watermarks on Web and SaaS applications (and utilizing a local client application with an embedded browser (CEB). An administrator would have the ability on a per application basis to add a watermark overlay for content that is displayed to a user. This mechanism can utilize a client application with an embedded browser (CEB), and can assure that the Web or SaaS application (network application) is only accessed from the CEB. The latter feature can provide administrators an option to watermark the content displayed from the CEB.

Figure 11:
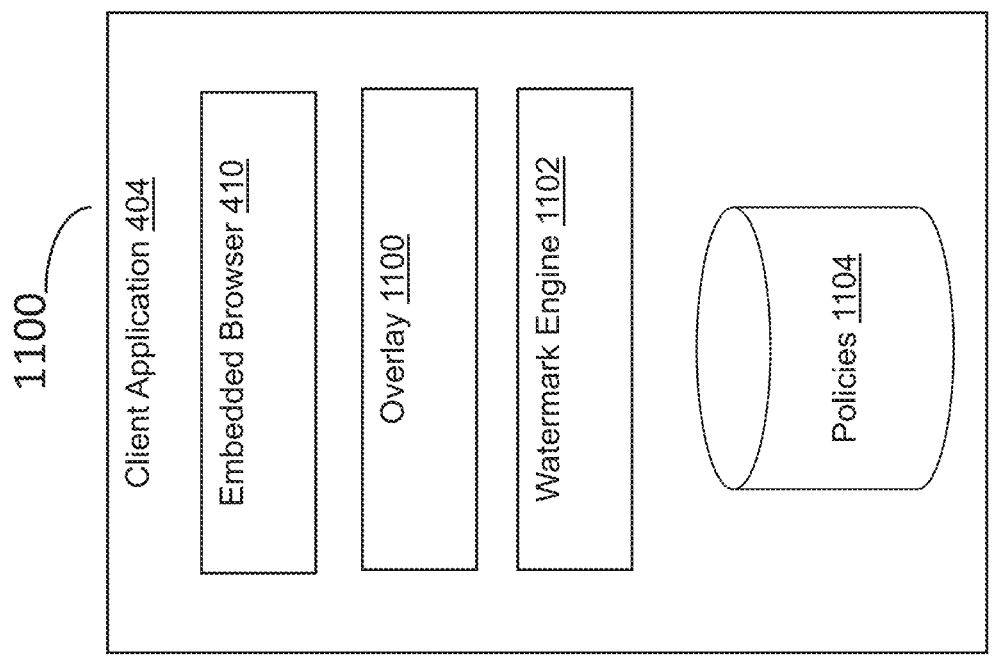
FIG. 11 is a block diagram of an example embodiment of a system for adding watermarks using an embedded browser.

Referring to FIG. 11, depicted is a block diagram of a system 1100 for adding watermarks using an embedded browser. The system 1100 may include a client application 404 that includes an embedded browser 410 that can render information of a network application accessed via the client application 404, an overlay 1100, a watermark engine 1102, and/or one or more policies 1104. The client application 404 may be an instance of the client application 404 previously detailed herein. The client application 404 with the embedded browser 410 (CEB) can include any element of a CEB as previously described herein. In some embodiments, the client applications 404 may execute on a client device 402 operated by a user. The network application may include any type or form of network application 406 previously detailed herein.

Each of the above-mentioned elements or entities is implemented in hardware, or a combination of hardware and software, in one or more embodiments. Each component of the system 1100 may be implemented using hardware or a combination of hardware or software detailed above in connection with FIG. 1. For instance, each of these elements or entities can include any application, program, library, script, task, service, process or any type and form of executable instructions executing on hardware of a client device (e.g., the client applications 404). The hardware includes circuitry such as one or more processors in one or more embodiments.

The watermark engine 1102 of the client application can be designed or implemented to generate and/or provide an overlay 1100 for at least a portion of the embedded browser. The portion can include a portion or region of a graphical user interface (GUI) of the embedded browser or CEB. The portion or region can include a display region or rendering region of the embedded browser, for displaying or rendering the network application. In some embodiments, the portion or region corresponds to or includes a region of the embedded browser for displaying or rendering a hypertext markup language (HTML) page or HTML, elements of the network application being accessed via the embedded browser. In certain embodiments, the portion or region corresponds to a portion or a full extent of a user interface of the CEB or embedded browser. The portion or region can correspond to some or any portion of the embedded browser used to display or present any type of information from the network application.

The watermark engine 1102 can include a HTML generator and/or editor. The watermark engine 1102 can generate a digital, electronic or virtual watermark in a display region of the embedded browser. The watermark engine 1102 can use metadata or information from the network application, such as the network application's user's name and/or a confidentially status of the content, to generate the form and/or content of the watermark. The watermark engine 1102 can select and/or incorporate one or more notifications into the watermark, according to an identity or user profile of a user, or the type of content or information being rendered or displayed to a user. The watermark engine 1102 can select a watermark from a plurality of existing or available watermarks (e.g., according to the type of information displayed, such as how sensitive or confidential the displayed information is). In some embodiments, the watermark engine 1102 can select from one of a plurality available templates to be augmented, modified or otherwise updated to form the watermark. The system can include a storage component accessible to the watermark engine 1102, for storing or maintaining the plurality of templates and/or available watermarks.

The watermark engine 1102 can generate, select, form or otherwise provide a watermark to include in the overlay 1100. The watermark engine 1102 can provide an overlay 1100 for each network application accessed via the embedded browser, and can assign, bind and/or incorporate each overlay 1100 to a corresponding network application. The watermark engine 1102 dynamically overlay a corresponding watermark to a display or rendering of a network application. For instance, upon establishing a display or rendering of content and/or elements of a SaaS application, the watermark engine 1102 can dynamically apply a corresponding overlay to the display or rendering, or update the display or rendering to include the overlay/watermark.

By way of an example, a user may access a first network application and a second network application via the embedded browser. The embedded browser can render content and/or elements of the first network application via/on a first tab of the embedded browser, and the second network application via/on a second tab of the embedded browser. When the first tab is made active, e.g., by switching over from the second tab so as to present the first network application to the user, the watermark engine 1102 apply or activate an overlay corresponding to the first network application. In some embodiments, the watermark engine 1102 applies a single overlay to multiple network applications that are being accessed via the embedded browser, and can configure the overlay according to the most sensitive information across multiple network applications (e.g., set to "highly confidential, where one network application has data that is highly confidential while the other the network applications have data that is not highly confidential). In some embodiments, a single overlay is used for multiple network applications, and the contents of the overlay is updated by the watermark engine 1102 according to which network application is currently active (e.g., displayed to a user).

In some embodiments, the watermark engine 1102 applies an overlay when triggered by a certain event, e.g., when a screen capture or image snipping/copying function (e.g., UI element or defined keystroke) is detected. For example, if the watermark engine 1102 detects a user interface element (e.g., a snapshot button) being available to the user onscreen or as part of the GUI of the embedded browser, the watermark engine 1102 can generate and/or apply the overlay. In some embodiments, in order to address the possibility that a photograph of a screen (displaying a rendering of network application data) can be acquired by a camera for instance, the watermark engine 1102 can apply the overlay prior to or at the time of rendering of the network application data.

The system can include one or more policies 1104. The policies 1104 can be accessed, retrieved, selected, applied and/or otherwise used by the watermark engine 1102 and/or the embedded browser 410 (or CEB) to manage an overlay for network application(s) accessed via the embedded browser 410 (or CEB). The policies 1104 can be stored or maintained in a storage component (e.g., the storage component that stores watermarks or related templates) on the client device and/or in a network location accessible by the watermark engine 1102. The watermark engine 1102 can apply the one or more policies 1104 on a network application being accessed via the CEB. For example, the watermark engine 1102 can apply the one or more policies 1104 on metadata or a profile of the network application (e.g., that provides an indication of the type(s) of possible data/content involved, such as the sensitivity or confidentiality requirements of the data/content), and/or on information of the network application being displayed or rendered via the embedded browser. For example, because the use of a CEB allows for real-time visibility into information provisioned or generated through the network application (accessed via the CEB), for instance even before such information is rendered by the embedded browser, the watermark engine 1102 can analyze or otherwise process the information to determine and/or provide a suitable watermark to accompany the information being displayed to a user. The watermark engine 1102 can for instance apply one or more policies 1104 dynamically to the information to generate and/or dynamically update the watermark.

In some embodiments, the policies can indicate if certain users, groups of users, and/or users fitting certain profiles, should be subject to the watermarking feature of the CEB. For example, if a certain behavior or combination of behaviors of a user is detected (e.g., a pattern of taking screen captures on certain types of data) by the watermark engine in applying some of the policies, the watermark engine can apply or utilize the watermarking feature as a precaution, deterrent and/or tracking mechanism.

The policies 1104 can indicate if certain network applications, groups of network applications, and/or network applications fitting certain profiles, should be subject to the watermarking feature of the CEB. For example, if a network application meets a certain profile being tracked via a policy, such as susceptibility to displaying potentially sensitive or confidential information (e.g., personally identifiable data, corporate sales figures, customer database), the watermark engine can apply or utilize the watermarking feature as a precaution, deterrent and/or tracking mechanism.

The policies 1104 can indicate if certain client devices (e.g., personally owned devices), geographical locations (e.g., off office premises), temporal windows for network application access (e.g., off office hours), workspaces, local computing environment, etc. (e.g., that fits a certain profile) should be subject to the watermarking feature of the CEB. For example, the watermarking engine can detect, via policy application, that a laptop of the user is being operated at home to access a SaaS application via a CEB installed on the laptop. Application of a relevant policy may determine that the location of the laptop meets a profile of locations where inappropriate photographing of the laptop's screen can occur. Based on the determination, the watermarking engine may determine that the use of the SaaS application should be subject to the watermarking feature of the CEB.

The policies 1104 can indicate if certain types of information (e.g., content, UI features, images, graphics, videos, designs, trademarks, names, personally identifiable data, financial data, account information, user id, passwords, and so on) and/or information fitting certain profiles, should be subject to the watermarking feature of the CEB. In some embodiments, the policies may identify predefined types of information for applying the watermarking feature. The predefined types of information may include personally identified information (PII), such as physical home address, email address, passport number, vehicle registration plate number, driver's license number, credit card numbers, telephone number, dollar amounts, and date of birth, and among others. In some embodiments, the predefined types of information may include confidential or restricted information, such as customer information, pricing information, and so on. In some embodiments, the predefined types of information may include metadata, sender name, and recipient name, among others.

In some embodiments, the watermarking engine may perform data analysis to identify one or more portions of information arising from accessing an application (locally installed, SaaS, Web or otherwise) via the embedded browser or CEB, to determine whether to apply a watermark, and the format and/or content of the watermark. The watermarking engine may use a model to identify one or more portions of the information that can trigger the watermarking feature. In some embodiments, the model may be part of a natural language processing algorithm. The model may include formats or regular expressions for the predefined types of information. In some embodiments, the model may include an artificial neural network with one or more weights. The watermarking engine may train the model using a training dataset. The training dataset may include textual corpus labeled as correlating to the predefined types of information that is suitable for watermarking or not. The textual corpus of the training dataset may for instance include sample physical home addresses, email addresses, passport numbers, vehicle registration plate numbers, driver's license numbers, credit card numbers, telephone numbers, dollar amounts, and dates of births, other among others. Once the model is trained, the watermarking engine may use the model to parse the information. In parsing the information, the watermarking engine may recognize or identify the one or more portions of the information as matching one of the predefined types of information in accordance with a policy 1104. In some embodiments, the watermarking engine may assign a score for the one or more portions of the information identified as matching one of the predefined types of information. The score may indicate a likelihood of match or a security risk measure. Based on the score and/or matching, the watermarking engine can determine whether to apply watermarking, and/or determine the format and/or content of the watermarking.

A watermark can include any type or form of information and/or images. For example, a watermark can include an indication, status or notification of the information relating to confidentiality and/or sensitivity (e.g., top secret, highly confidential, highly sensitive, preliminary, work-in-progress, draft, attorney-client privileged, copyright). A watermark can include an instruction and/or guidance (e.g., do not disseminate, do not copy, for internal use only, for XX department use only, copyright protected). A watermark can include a logo or other indication of source or ownership of the displayed information. A watermark can include a recurring pattern of text and/or graphics to provide coverage over a portion of or the entirety of a display or rendering region of the embedded browser. A watermark can include text in multiple languages. A watermark can include information about the entity or entities accessing the information or corresponding network application (e.g., the user, the client application, the client device, and so on), for tracking and non-repudiation purposes. A watermark can include a context for the information being accessed or displayed, such as the time of it being displayed, a location of the client device, etc., which can be used for tracking purposes for instance.

The overlay 1100 can be a HTML, element that can be rendered in or on the UI of the embedded browser, and/or a UI element that can be added to the UI of the embedded browser. The overlay 1100 can for instance be injected by the watermark engine into a HTML rendition/component of an interface of the network application. In some embodiments, the overlay 1100 can be an independent graphical element that is aligned with, and on top or a region of the embedded browser displayed to the user. In some embodiments, the overlay 1100 can be blended into the region of the embedded browser displayed to the user, or into elements of the network application displayed to the user.

For example, the overlay can include an HTML div element/object (or other HTML element/object) layered or integrated on top of a page or output of the embedded browser. The watermarking engine can assign the HTML div element/object a cascading stylesheet (CSS) property of "pointer-events: none" or other suitable setting. This can allow a user's mouse or other interaction events to go through the HTML element/object. The user can be able to navigate the page and/or embedded browser, despite the HTML element/object (e.g., including the watermark) being on top of the embedded browser. Elements (e.g., text and/or graphics) of the watermark can be set or configured by the watermark engine to a very low opacity such as "rgba(0,0,0,0.002)" and/or can be configured to only be outlined for instance. This can make the watermark appear as if it is invisible to the user. In some embodiments, the watermark can be seen if a screen shot is captured of the displayed elements of the embedded browser (and/or the network application), and imported into a graphics editor (e.g., such as Adobe Photoshop). For instance, brightness can be lowered and/or contrast can be increased using the graphics editor, to allow the watermark to become visible to the human eye.

Figure 12:
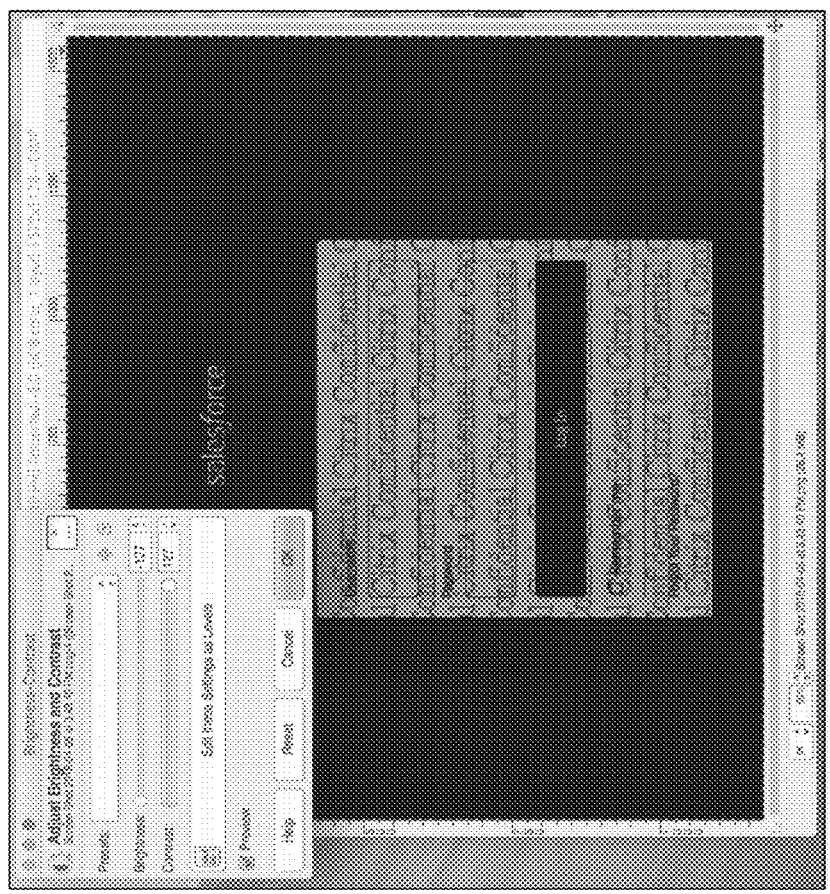
FIG. 12 is an example representation of information rendered on an embedded browser and an image of the information overlaid with a watermark.
Figure 12:
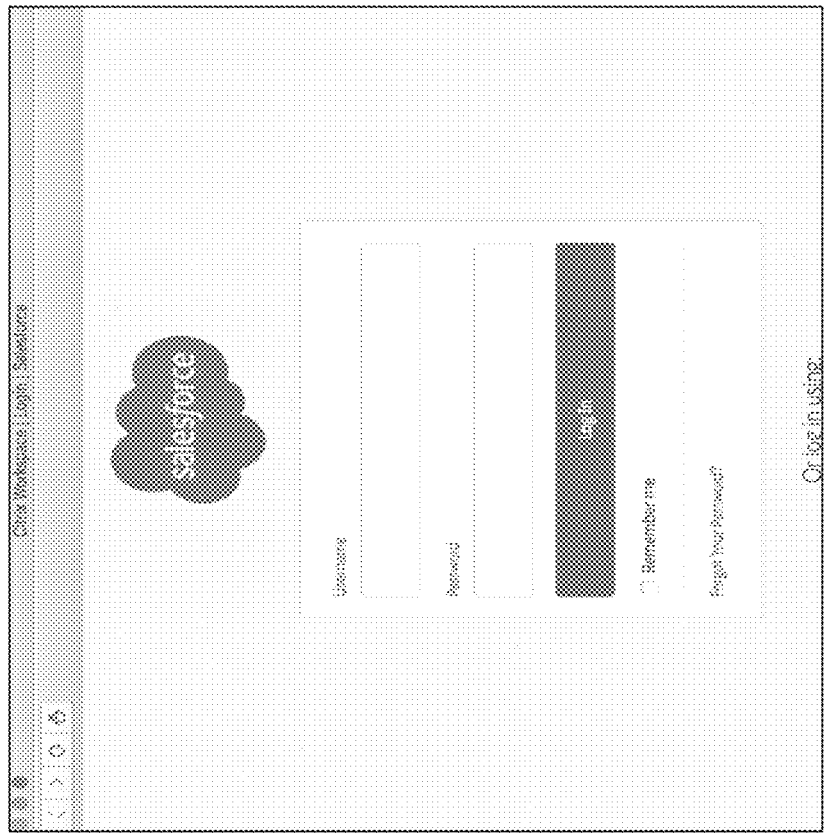

By way of illustration, FIG. 12 on the left side provides a representation of a workspace displayed via an embedded browser. On the right side, an image of the workspace is shown, with the brightness and/or contrast of the image adjusted to reveal the digital watermark elements to a user.

In some embodiments, tracking tools incorporating such features and capabilities can dynamically and/or automatically detect watermarks in images. In certain embodiments, tracking tools can process an image to detect elements of the overlay (e.g., div element/object, text of the watermark) to determine if misuse of network application information may have occurred. In some implementations, the watermark is configured to be visible (e.g., translucent or faint in nature, alpha-blended with the displayed information) to the user, for deterrence purposes for instance. In certain implementation, the CEB can adjust the visibility of the watermark dynamically or temporally, e.g., to be visible or emphasized when screenshot capability is detected, and/or when imaging is performed and detected.

Figure 13:
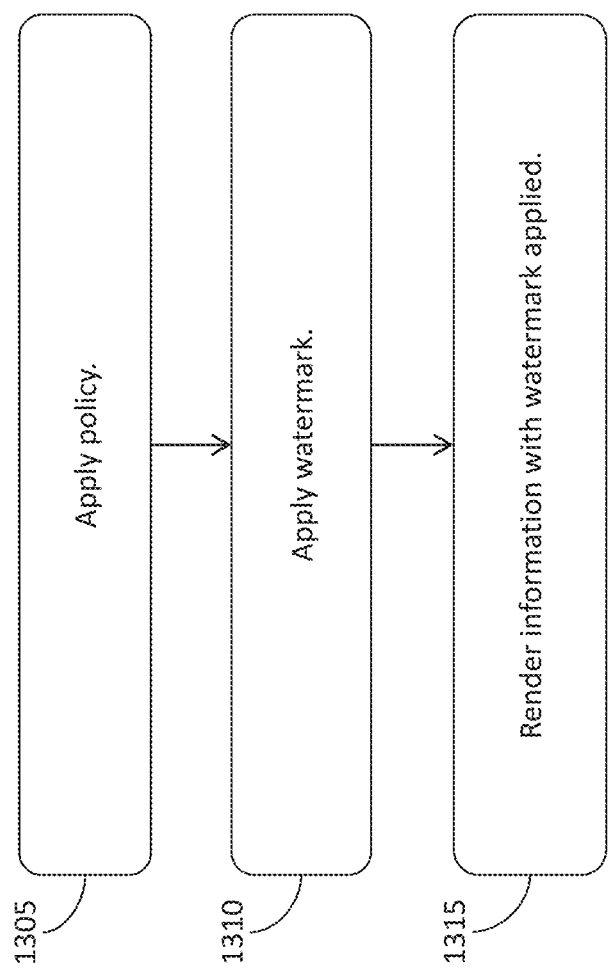
FIG. 13 is a flow diagram of an example embodiment of a method for adding watermarks using an embedded browser.

Referring to FIG. 13, depicted is a flow diagram of a method 1300 of adding watermarks using an embedded browser. The functionalities of the method may be implemented using, or performed by, the components detailed herein in connection with FIGS. 1-12. In brief overview, a watermarking engine can apply one or more policies in connection with accessing a network application via an embedded browser (1305). Based on the application of the policies, the watermarking engine can determine to apply a watermark to information being displayed arising from accessing the network application (1310). Responsive to applying the watermark, the embedded browser can display or render the information to a user (1315).

Figure 14:
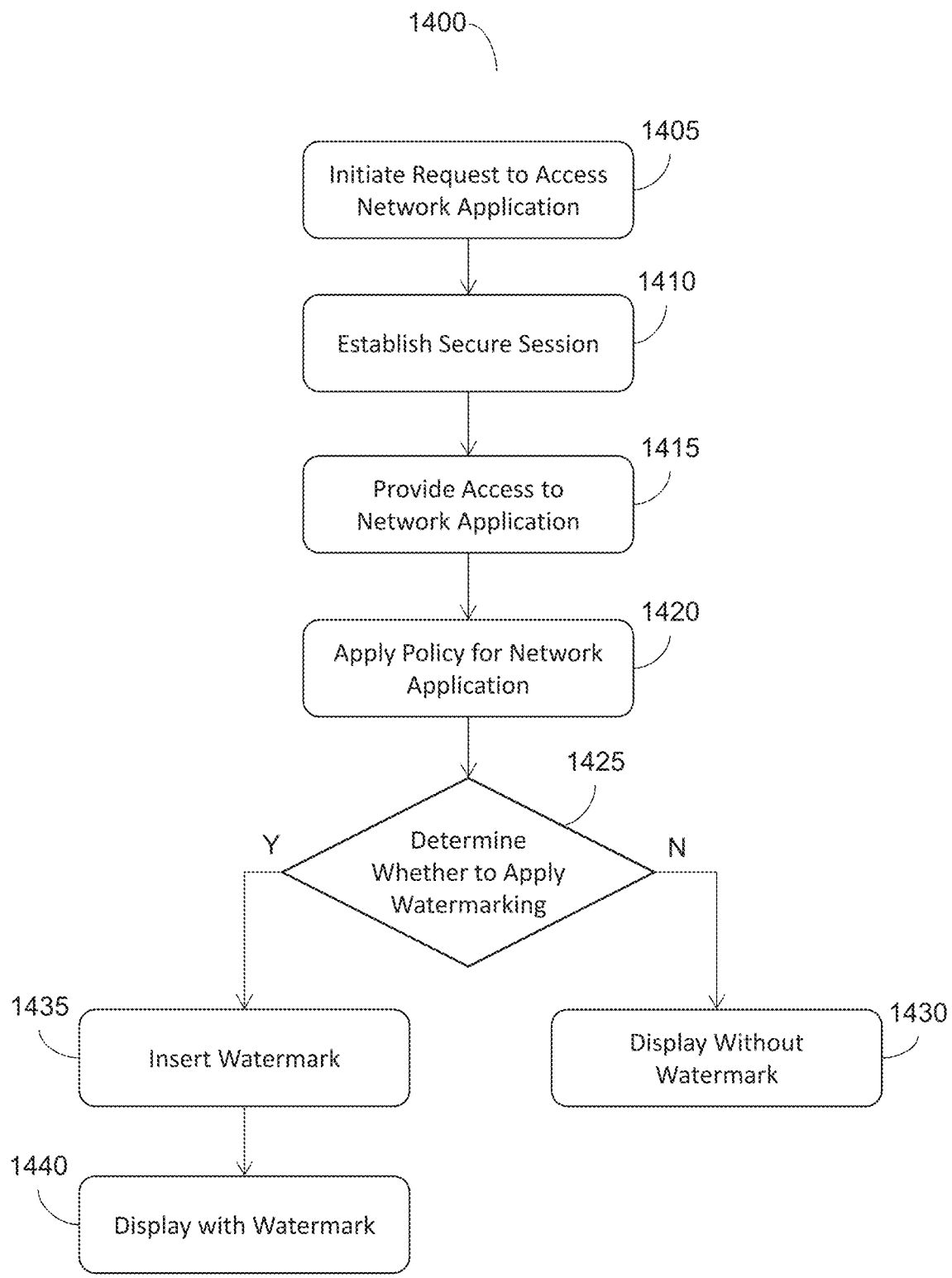
FIG. 14 is a flow diagram of an example embodiment of a method of watermarking on embedded browsers.

Referring now to FIG. 14, depicted is a flow diagram of a method 1400 of watermarking using embedded browsers. The functions of the method 1400 may be implemented using or performed by components detailed herein in conjunction with FIGS. 1-13. In brief overview, an embedded browser of a client application may initiate a request to access a network application (1405). The client application may establish a secure session (1410). The embedded browser may provide access to the network application (1415). A watermarking engine of the client application may apply a policy for accessing the network application (1420). The watermarking engine may determine whether to apply a watermark (1425). If the watermarking engine determines to not to apply the watermark, the embedded browser may display without the watermark (1430). On the other hand, if the watermarking engine determines to apply the watermark, the watermarking engine may insert the watermark (1435). The embedded browser may display with the watermark (1440).

In further detail, an embedded browser (e.g., the embedded browser 410) of a client application (e.g., the client application 404) may initiate a request to access a network application (e.g., the network application 406) (1405). The request may be initiated via an embedded browser executing on a client device (e.g., the client device 402). The embedded browser may generate the request in response to a user interaction with a user interface rendered within a viewport of the embedded browser. The user interface may include or correspond to an interaction event (e.g., a click, a mouse press, a keypress, or a screen touch) with a user interface element rendered within the viewport of the embedded browser. The request to access (sometimes herein referred as an access request) may identify or specify which network application is to be accessed by the embedded browser. For example, the request may include a header field (e.g., a destination field in an HTTP request) identifying which network application is to be accessed. In some embodiments, the request to access may include a web address (e.g., a Uniform Resource Identifier (URI), or a Uniform Resource Locator (URL)) referencing the network application. In some embodiments, the request to access may include a network address (e.g., an Internet Protocol (IP) address, a media access control (MAC) address, and/or port number) referencing one or more servers hosting the network application. The request to access may also identify which component (e.g., the embedded browser) on the client device initiated the request. For example, the request may include a header field (e.g., user-agent field in an HTTP request) identifying the component.

The client application may establish a secure session (1410). The secure session (also referred to as an application session) may be used to communicate between the embedded browser of the client application and the network application (or host server). Subsequent to the request to access, the client application may receive configuration parameters from a gateway service for the establishment of the secure session (e.g., from the access gateway 422 on the cloud services 408 operating on a network device 432). The configuration parameters may include, for example: a source address (e.g., a network address) referencing the client application or the embedded browser, a destination address (e.g., a network address) referencing the server hosting the network application, communications protocol (e.g., VPN or IPsec), and/or encryption parameters (e.g., encryption algorithms and keys). With (or in response to) the identification of the configuration parameters, the client application may establish the secure session in accordance with the configuration parameters. The client application may create the secure session in accordance with the communications protocol. In establishing the secure session, the client application may set the source address referencing the embedded browser (or the virtualized embedded browser) and the destination address referencing the server hosting the network application. Although a secure session is discussed herein, this is merely illustrative and therefore any other type of session can apply as well.

The embedded browser may provide access to the network application (1415). With the establishment of the secure session, the embedded browser may provide access to the network application via the secure session. In providing access, the embedded browser may commence to encrypt data to be sent to the network application using the encryption parameters. The data may include one or more packets related to the network application. Once encrypted, the client application may send the data via the secure session to the server hosting the network application. In some embodiments, the client application may generate and send data, in response to a user interaction with the user interface. The user interaction may be subsequent to or in conjunction with the request to access the network application. In some embodiments, the client application may store and maintain the configuration parameters for the established secure session.

In some embodiments, the embedded browser may receive encrypted data sent by the network application via the secure session. The receipt of the encrypted data from the network application may be in response to sending of encrypted data from the client application over the secure session. For example, the embedded browser may have sent data to request resources related to the network application, and may in turn receive encrypted data corresponding to the requested resources over the secure session from the network application. In some embodiments, the embedded browser may decrypt the data in accordance to the encryption parameters included in the configuration parameters for the secure session. Upon receipt of the data, the embedded browser may decrypt the data by applying the configuration parameters to recover the original data. The decryption of the data may be prior to further processing by the embedded browser.

A watermarking engine (e.g., the watermarking engine 1102) of the client application may apply a policy (e.g., the policies 1104) in accessing the network application via the embedded browser (1420). The policy may specify or indicate whether the network application and/or the network application's data is to be applied with watermarking based on one or more factors. The policy may also specify on which portion of the embedded browser the watermark is to be applied. The policy may specify a content or format of the watermark to be applied. The factors for applying a watermark may include an identity or profile of a user of the network application, user behavior, network application profile, device profile, type of information to be watermarked, a time or temporal window for accessing the network application, and acquirabillty of network application data, among others. The identity or profile of a user may identify certain users (e.g., using account identifiers), groups of users (e.g., physical or network location), or users with specified trait information (e.g., account type or demographic) to be subject to watermarking. The user behavior may include interaction events or user actions (e.g., taking screen captures, or failure in account credential authentication), associated with a potential risk for instance. The network application profile may include certain network applications (e.g., associated with certain application names), groups of network applications (e.g., associated with a host server), or functionalities (e.g., potentially displaying sensitive or confidential information). The device profile may include a device ownership (e.g., personal or corporate ownership), a geographical location (e.g., off-premise or on premise), workspaces, or computing environments (e.g., a type of network or cloud service) subject to watermarking. The information type may include certain types of data (e.g., content, UI features, images, graphics, videos, designs, trademarks, names, personally identifiable data, financial data, account information, user identifier, and passwords) accessible via the network application subject to watermarking. The time or temporal window may indicate time (e.g., hours of the day, office hours, weekend time) associated with accessing of the network application. The acquirabillty of network application data may include whether image acquisition of the information is performed or is possible.

To determine whether to apply a watermark and/or to determine a watermark to apply, the watermarking engine may determine or identify the factors for the one or more policies. In some embodiments, the watermarking engine may identify the user profile associated a user operating the embedded browser on the client device. The watermarking engine may identify the user, a group to which the user belongs, and/or trait information associated with the user. In some embodiments, the watermarking engine may measure, determine, detect or identify the user behavior of the user operating the embedded browser. For example, the watermarking engine may access a log record of user interactions of the user on the client device for the embedded browser.

In some embodiments, the watermarking engine may identify the network application profile of the network application accessed by the embedded browser, as a factor for the one or more policies. The watermarking engine may for instance determine a risk profile or reputation of the network application. The watermarking engine may identify the network application itself, a group or type to which the network application is associated with, or functionalities of the network application. In some embodiments, the watermarking engine may identify or determine a temporal window (e.g., off-office hours) associated with the accessing of the network application. The watermarking engine may access the log record of user interactions of the user on the client device for the embedded browser. From the log record, the watermarking engine may determine times at which the network application is accessed via the embedded browser. For example, the watermarking engine may identify a start time and/or an end time of accessing of the network application as indicated in the log record. Based on the time(s), the watermarking engine may determine the temporal window.

In some embodiments, the watermarking engine may determine the device profile of the client device running the embedded browser, as a factor for the one or more policies. The watermarking engine may for instance determine a risk profile or reputation of the client device. The watermarking engine may identify the device ownership of the client device, the geographic location, the workspaces, and the computing environment of the client device (or the client application). For example, the watermarking engine may identify the client device running the embedded browser as accessed through a Software as a service (SaaS) cloud platform. The watermarking engine in this example may also identify the network type of the secure session as a virtual private network (VPN) and may identify a connection speed of the client device over the secure session.

In some embodiments, the watermarking engine may identify an information type of the data to be accessed via the network application, as a factor for the one or more policies. The watermarking engine may for instance determine a risk profile, sensitivity level and/or confidentiality of the data. The watermarking engine may identify the information accessible or to be accessed via the network application over the secure connection. The information may include textual data or graphic data. The watermarking engine may apply semantic analysis algorithms on the textual data of the information to identify names, personally identifiable data, financial data, account information, user identifier, and passwords, among others, from the information. The semantic analysis algorithms may include named entity recognition, regular expression matching, information retrieval, and latent semantic indexing, among others. In some embodiments, the watermarking engine may convert the graphical data to textual data using optical character recognition (OCR) algorithms. The watermarking engine may apply computer vision algorithms to the graphical data of the information to identify content, UI features, images, graphics, videos, designs, and trademarks, among others, from the information. The computer vision algorithms may include object recognition algorithms, such as edge detection, feature detection, blob detection, and affine invariant feature detection, among others.

In some embodiments, the watermarking engine may determine the acquirability of the information accessible or to be accessed via the network application using the embedded browser over the secure session, as a factor for the one or more policies. To determine acquirability, the watermarking engine may determine whether image acquisition or copying of the information is possible or is being performed. In some embodiments, with the decryption of the data (or information) received from the network application, the watermarking engine may identify a data type of the data. The data type can be one of textual, audio, or visual (e.g., image or video), among others. If the data type is audio, the watermarking engine may determine that image acquisition of the information is not possible. If the data type is possibly textual, the watermarking engine may in some embodiments process the data using an optical character recognition (OCR) algorithm for evaluation, and may also determine that image acquisition of the textual data is possible. If the data type is graphic, the watermarking engine may for instance determine that image acquisition is possible. In some embodiments, the watermarking engine may identify whether a user, application and/or client device is performing image acquisition of information accessed through the network application. If for instance a printing, copying or snapshot function is activated or available, the watermarking engine may determine that image acquisition is being performed or is possible. If the embedded browser and/or data of the network application is not visible on screen or is hidden, the watermarking engine may determine that image acquisition is not possible or being performed.

Based on the identification of the factors, the watermarking engine may select, identify and/or apply the one or more policies. Each policy may specify one or more factors (e.g., one or more conditions or scenarios) under which watermarking is to be applied or is not to be applied. The watermarking engine may compare the identified factors with the factors specified by each policy. When the identified factors are determined to match the specified factors of a corresponding policy, the watermarking engine may select, identify and/or apply the policy. Conversely, when the identified factors are determined to not match the specified factors of the corresponding policy, the watermarking engine may skip or ignore the policy, and may identify another policy to compare the associated factors, for example. The watermarking engine may traverse through a plurality of policies and/or factors to determine which policy to apply.

The watermarking engine may determine whether to apply a watermark (1425). With the application of the policy, the watermarking engine may determine whether to apply the watermark to information of the network application accessed via the embedded browser. The identified policy may specify whether the watermarking is to be applied or not to be applied. From the identified policy, the watermarking engine may determine, select or identify a type, pattern and/or form of watermark to apply, and/or a content to include in the watermark. When the policy specifies that the watermark is to be applied, the watermarking engine may apply the watermark (e.g., as a digital overlay over data associated with the network application). On the other hand, when the policy specifies that the watermark is not to be applied, the watermarking engine may determine to not apply the watermark.

If the watermarking engine determines to not to apply the watermark, the embedded browser may display or render information (e.g., associated with the network application) without the watermark (1430). The embedded browser may render and display the information of the network application without any watermarking. Upon decryption of the data, the embedded browser may render the data without any addition or overlaying of the watermarking. The information rendered and displayed via the embedded browser of the network application may lack the watermarking.

On the other hand, if the watermarking engine determines to apply the watermark, the watermarking engine may insert the watermark (1435). The watermark may include an overlay (e.g., the overlay 1110) to be rendered within the embedded browser. In some embodiments, the watermark may include a Hypertext Markup Language (HTML) element rendered or added to the embedded browser. In some embodiments, the watermark may include a user interface element to be rendered or added on the embedded browser. In some embodiments, the watermark (e.g., the HTML element or the user interface element) may be implemented or designed to lack an event handler or event listener for user interactions with the watermark. In some embodiments, an event handler or event listener of the watermark may ignore or perform no action in response to the corresponding user interaction on the watermark. For example, the HTML element may be configured to ignore pointer events (e.g., mouse clicks or hover overs) from the user interaction with the HTML element.

In some embodiments, the watermarking engine may apply the watermark by adding or overlaying the watermark on at least one portion of the embedded browser. The portion may include a user interface of the embedded browser, a display region of the embedded browser, or the information of the network application. The user interface may include one or more graphical user interface elements of the embedded browser. The display region of the embedded region may include a viewport of the embedded browser. The display region may be a subset portion of the user interface of the client application. The information of the network application may include data from the network application displayed within the display region of the embedded browser. In some embodiments, the watermarking engine may identify the one or more portions on which to apply the watermark. The identification of the one or more portions may be in accordance to the one or more policies applied.

In some embodiments, the watermarking engine may determine the content or the format of the watermark based on the policy applied. The content may include visual components included in the watermarking, such as lines, curves, shapes, patterns, and colors, among others. The format may include graphic properties of the watermark, such as overall shape, size, compositing, and transparency, among others. The policy may specify the content or the format of the watermark according to the factors under which the watermarking is to be subject as indicated by the policy. From the selected policy, the watermarking engine may identify the specified content or format of the watermark to be applied. In some embodiments, the watermarking engine may determine the content or the format based on the factors in selecting the policy. For example, the watermarking engine may determine the content or the format in accordance with the information of the network application.

In some embodiments, the watermarking engine may alter an appearance or a visibility of the watermark according to a user behavior of the user operating the client device. The appearance may include the visual components included in the watermark and the graphic properties of the watermark. The visibility of the watermark may specify a degree of transparency of the watermark. Upon determining to apply the watermark, the watermarking engine may monitor for interaction events or user interactions with the embedded browser. In response to detecting a user interaction on the embedded browser, the watermarking engine may determine whether the user interaction type is one of a set of user interactions associated with data extraction, copying and/or imaging. The set of user actions may include image screen capture or keystrokes for copying data. When determined to match one of the user interactions, the watermarking engine may alter or set the appearance or the visibility of the watermark. For example, upon detecting a screen capture, the watermarking engine may set the size, color, transparency and/or visibility of the watermark.

In some embodiments, the watermarking engine may alter the appearance or the visibility of the watermark according to a content or a characteristic of the information displayed or acquired from the network application. The content of the information may include visual components included in the information, such as text size, font, lines, curves, shapes, patterns, and colors, among others. The characteristic of the information may include graphic properties, such as overall shape, size, or position within the embedded browser, among others. The watermarking engine may identify the content or the characteristic of the information from the network application. When the watermark is determined to be applied, the watermarking engine may compare the content or the characteristic to a set of content or characteristics (e.g., sensitivity, privacy or confidentiality of the data) to be prevented from data extraction, copying and/or imaging. When determined to match one of the set, the watermarking engine may alter or set the appearance or the visibility of the watermark. For example, upon determining that the information is negative space within the embedded browser, the watermarking engine may set the transparency of the watermark to be full or may remove the watermark from the identified negative space.

The embedded browser may display with the watermark (1440). The embedded browser may render and display the information of the network application with the watermarking. Upon decryption of the data and the insertion of the watermark, the embedded browser may render and display the information with the addition or inclusion of the watermark. The information rendered and displayed within the embedded browser for the network application may include the watermark (e.g., in visible form or in low-visibility form). When the information overlaid with the watermark is within the viewport, the information visible through the viewport may include the watermark.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method comprising:
   identifying, by the client device, a profile of an application hosted on one or more servers being accessed by the client device, the application providing data to the client device;
   determining, by the client device based at least on the profile of the application, that a watermark is to be inserted to the data provided by the application;
   inserting, by the client device responsive to the determining, the watermark to the data provided by the application; and
   causing, by the client device, display of the data from the application with the watermark.

2. The method of claim 1, further comprising determining, by the client device, one of a content or a format of the watermark to be inserted.

3. The method of claim 1, wherein the profile of the application identifies one or more of the following: one or more application names and one or more servers hosting the application.

4. The method of claim 1, wherein the profile of the application indicates a sensitivity of the data being provided.

5. The method of claim 1, wherein the profile of the application indicates type of data being provided.

6. The method of claim 1, further comprising receiving, by the client device, the data from the application encrypted and decrypting the data to inset the watermark.

7. The method of claim 1, further comprising selecting, by the client device based at least on the profile of the application, a rule from a plurality of rules to determine that the watermark is to be inserted.

8. A device comprising:
   one or more processors, coupled to memory and configured to:
      identify a profile of an application hosted on one or more servers being accessed by the device, the application providing data to the device;
      determine, based at least on the profile of the application, that a watermark is to be inserted to the data provided by the application;
      insert, responsive to the determining, the watermark to the data provided by the application; and
      cause display of the data from the application with the watermark.

9. The device of claim 8, wherein the one or more processors are further configured to determine one of a content or a format of the watermark to be inserted.

10. The device of claim 8, wherein the profile of the application identifies one or more of the following: one or more application names and one or more servers hosting the application.

11. The device of claim 8, wherein the profile of the application indicates a sensitivity of the data being provided.

12. The device of claim 8, wherein the profile of the application indicates type of data being provided.

13. The device of claim 8, wherein the one or more processors are further configured to receive the data from the application encrypted and decrypt the data to inset the watermark.

14. The device of claim 8, wherein the one or more processors are further configured to select, based at least on the profile of the application, a rule from a plurality of rules to determine that the watermark is to be inserted.

15. A system comprising:
   a client device configured to access an application hosted on one or more servers that provides data to the client, the client device configured to:
      identify a profile of one of the client device accessing the application or a user of the application;
      determine, based at least on the profile, that a watermark is to be inserted to the data provided by the application;
      modify, responsive to the determining, the data provided by the application to include the watermark; and
      cause display of the data from the application with the watermark.

16. The system of claim 15, wherein the profile of the user identifies account identifiers or types.

17. The system of claim 15, wherein the profile of the device identifies one or more of the following: device ownership, a geographical location or a computing environment.

18. The system of claim 15, wherein the client device is further configured to select, based at least on the profile, a rule from a plurality of rules to determine that the watermark is to be inserted.

19. The system of claim 15, wherein the client device comprises a client application with an embedded browser to access the application and receive the date from the application.

20. The system of claim 15, wherein the client device is further configured to receive the data encrypted from the application and decrypt the data to modify the data to include watermark.

* * * * *